(12) United States Patent
Sugahara

(10) Patent No.: US 7,527,358 B2
(45) Date of Patent: May 5, 2009

(54) LIQUID TRANSFER DEVICE AND LIQUID TRANSFER HEAD

(75) Inventor: Hiroto Sugahara, Ama-gun (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 513 days.

(21) Appl. No.: 11/188,036

(22) Filed: Jul. 25, 2005

(65) Prior Publication Data

US 2006/0024207 A1 Feb. 2, 2006
US 2006/0245979 A9 Nov. 2, 2006

(30) Foreign Application Priority Data

Jul. 27, 2004 (JP) ............................. 2004-218745

(51) Int. Cl.
*B41J 2/04* (2006.01)
*F16K 31/02* (2006.01)
*B01L 3/02* (2006.01)

(52) U.S. Cl. ..................... 347/54; 251/129.01; 422/100
(58) Field of Classification Search .................... 347/54
See application file for complete search history.

(56) References Cited

U.S. PATENT DOCUMENTS

| | | | | |
|---|---|---|---|---|
| 4,928,125 | A * | 5/1990 | Iino | 347/54 |
| 5,486,337 | A | 1/1996 | Ohkawa | |
| 5,992,820 | A | 11/1999 | Fare et al. | |
| 6,231,177 | B1 | 5/2001 | Cherukuri et al. | |
| 6,406,131 | B2 * | 6/2002 | Lerat et al. | 347/54 |
| 6,545,815 | B2 | 4/2003 | Kroupenkine et al. | |
| 6,565,727 | B1 | 5/2003 | Shenderov | |
| 6,958,132 | B2 * | 10/2005 | Chiou et al. | 422/100 |
| 6,969,166 | B2 * | 11/2005 | Clark et al. | 347/101 |
| 7,264,337 | B2 * | 9/2007 | Lee et al. | 347/55 |
| 7,328,979 | B2 * | 2/2008 | Decre et al. | 347/55 |
| 2002/0012025 | A1 * | 1/2002 | Lerat et al. | 347/54 |
| 2003/0202051 | A1 | 10/2003 | Ito et al. | |
| 2004/0058450 | A1 | 3/2004 | Pamula et al. | |
| 2006/0153745 | A1 * | 7/2006 | Ermakov | 422/130 |

FOREIGN PATENT DOCUMENTS

| | | |
|---|---|---|
| EP | 0 976 557 | 2/2000 |
| EP | 1 014 140 | 6/2000 |

(Continued)

*Primary Examiner*—Matthew Luu
*Assistant Examiner*—Shelby Fidler
(74) *Attorney, Agent, or Firm*—Banner & Witcoff, Ltd

(57) ABSTRACT

A liquid transfer device includes therein a liquid flow passage in which an insulating region and a neighboring region lower in liquid-repellent than the insulating region and neighboring the insulating region in the direction of flow of liquid, are formed on a flow passage defining face. A first electrode is covered with a flow passage area provided in the insulating region so as to neighbor the neighboring region and extend over the whole length of the insulating region in the direction of flow of liquid. A second electrode is covered with a first bubble hold area provided in the insulating region so as to neighbor the neighboring region. By controlling the potentials of the first and second electrodes, the liquid flow passage is changed over between a first state wherein liquid can be transferred on the flow passage area, and a second state wherein the liquid flow passage is closed by a meniscus formed such that the flow passage area is covered with no liquid.

35 Claims, 24 Drawing Sheets

FOREIGN PATENT DOCUMENTS

| | | |
|---|---|---|
| JP | 2003-177219 | 6/2003 |
| JP | 2003-326712 | 11/2003 |
| WO | WO - 02/07503 | 1/2002 |
| WO | WO - 03/046256 | 6/2003 |
| WO | WO 2005019875 A2 * | 3/2005 |

* cited by examiner

LIQUID TRANSFER DEVICE AND LIQUID TRANSFER HEAD

BACKGROUND OF THE INVENTION

1. Field of the Invention

The present invention relates to a liquid transfer device and a liquid transfer head for transferring conductive liquid.

2. Description of Related Art

Conventionally, as printing devices for printing on a medium to be printed, such as a paper, for example, inkjet heads of various types are known for ejecting ink onto a paper or the like. For example, JP-A-2003-326712 discloses an inkjet head including a passage unit and a piezoelectric actuator unit. The passage unit has therein a plurality of individual ink flow passages each of which includes a pressure chamber connected to a nozzle. The actuator unit is for applying pressure to ink in the respective pressure chambers of the passage unit. In general, the piezoelectric actuator unit has a plurality of individual electrodes corresponding to the respective pressure chambers connected to the nozzles; a common electrode opposed to the plurality of individual electrodes; and a piezoelectric layer made of lead zirconate titanate (PZT), sandwiched by the individual electrodes and the common electrode. When the electric potential of an individual electrode is controlled to be different from that of the common electrode, an electric field is applied to the portion of the piezoelectric layer sandwiched by the individual electrode and the common electrode and thereby the piezoelectric layer is partially deformed. By the deformation of the piezoelectric layer, pressure is applied to the ink in the corresponding pressure chamber. Thus, ink is ejected through the nozzle connected to the pressure chamber.

In the above-described inkjet head, the plurality of individual ink flow passages each including a nozzle and a pressure chamber, are formed in the passage unit, and the actuator unit having the plurality of individual electrodes, the common electrode, and the piezoelectric layer, is disposed on a surface of the passage unit. Therefore, the construction of the inkjet head is considerably complicated, and this brings about an increase in the manufacturing cost. In addition, each pressure chamber must have a certain volume or more for ejecting a desired amount of ink. As a result, in the case that a large number of nozzles and a large number of pressure chambers are required to be formed in an inkjet head, however, it is difficult that a plurality of individual ink flow passages including the respective nozzles and pressure chambers are densely formed in a passage unit. That is, reduction in size of the inkjet head is difficult.

SUMMARY OF THE INVENTION

An object of the present invention is to provide a liquid transfer device and a liquid transfer head, capable of transferring liquid by a simple construction.

According to an aspect of the present invention, a liquid transfer device comprises a liquid flow passage defined by one or more flow passage defining faces, the liquid flow passage comprising insulating regions and a first neighboring region formed on at least one of the flow passage defining faces, the first neighboring region being lower in liquid-repellent than the insulating regions and neighboring the insulating regions in a direction of flow of liquid; a first electrode covered with a flow passage area provided in at least one of the insulating regions so as to neighbor the first neighboring region, the flow passage area extending over a whole length of the insulating region in the direction of flow of liquid; a second electrode covered with a first bubble hold area provided in at least one of the insulating regions so as to neighbor the first neighboring region; and an opening/closing controller that controls potentials of the first and second electrodes to change over the liquid flow passage between a first state wherein pressurized liquid is transferred on the flow passage area with the first bubble hold area being controlled so as to be covered with no liquid, and a second state wherein the liquid flow passage is closed by a meniscus formed such that the first bubble hold area is covered with liquid and the flow passage area is covered with no liquid.

According to another aspect of the present invention, a liquid transfer device comprises a liquid flow passage substantially rectangular in cross section, comprising an insulating region and a first and a second neighboring regions formed on one flow passage defining face, the first and second neighboring regions being lower in liquid-repellent than the insulating region and neighboring the insulating region so as to sandwich the insulating region in a direction of flow of liquid; a first electrode covered with a flow passage area provided in the insulating region in a central portion of a width of the flow passage defining face so as to neighbor the first and second neighboring regions and extend over a whole length of the insulating region in the direction of flow of liquid; two second electrodes each covered with a first bubble hold area formed in the insulating region at each end of the width of the flow passage defining face so as to neighbor the first neighboring region and not to overlap the flow passage area in the direction of flow of liquid; two third electrodes each covered with a second bubble hold area formed in the insulating region at each end of the width of the flow passage defining face so as to neighbor the second neighboring region and not to overlap the flow passage area in the direction of flow of liquid; and an opening/closing controller that controls potentials of the first to third electrodes to change over the liquid flow passage between a first state wherein pressurized liquid is transferred on the flow passage area with the first and second bubble hold areas being controlled so as to be covered with no liquid, and a second state wherein the liquid flow passage is closed by a meniscus formed such that the first and second bubble hold areas are covered with liquid and the flow passage area is covered with no liquid.

According to still another aspect of the present invention, a liquid transfer device comprises a liquid flow passage that can allow pressurized liquid to flow therein; a first electrode; a second electrode; a potential signal supply unit that supplies potential signals to the respective first and second electrodes; an insulating region comprising a flow passage area covering the first electrode on an inner surface of the liquid flow passage, and a bubble hold area covering the second electrode on an inner surface of the liquid flow passage; a neighboring region formed on an inner surface of the liquid flow passage, the neighboring region being lower in liquid-repellent than the flow passage area when there is no difference in potential between the liquid and the first electrode, and than the bubble hold area when there is no difference in potential between the liquid and the second electrode; and a potential change instruction unit that instructs the potential signal supply unit to supply a potential signal to the second electrode so as to generate a difference in potential between the liquid and the second electrode so that gas exists on a surface of the flow passage area to close the liquid flow passage, and that instructs the potential signal supply unit to supply a potential signal to the first electrode so as to generate a difference in potential between the liquid and the first electrode so that gas exists on a surface of the bubble hold area to open the liquid flow passage.

According to still another aspect of the present invention, a liquid transfer head comprises a liquid flow passage defined by one or more flow passage defining faces, the liquid flow passage comprising insulating regions and a first neighboring region formed on at least one of the flow passage defining faces, the first neighboring region being lower in liquid-repellent than the insulating regions and neighboring the insulating regions in a direction of flow of liquid; a first electrode covered with a flow passage area provided in at least one of the insulating regions so as to neighbor the first neighboring region, the flow passage area extending over a whole length of the insulating region in the direction of flow of liquid; and a second electrode covered with a first bubble hold area provided in at least one of the insulating regions so as to neighbor the first neighboring region.

According to still another aspect of the present invention, a liquid transfer head comprises a liquid flow passage substantially rectangular in cross section, comprising an insulating region and a first and a second neighboring regions formed on one flow passage defining face, the first and second neighboring regions being lower in liquid-repellent than the insulating region and neighboring the insulating region so as to sandwich the insulating region in a direction of flow of liquid; a first electrode covered with a flow passage area provided in the insulating region in a central portion of a width of the flow passage defining face so as to neighbor the first and second neighboring regions and extend over a whole length of the insulating region in the direction of flow of liquid; two second electrodes each covered with a first bubble hold area formed in the insulating region at each end of the width of the flow passage defining face so as to neighbor the first neighboring region and not to overlap the flow passage area in the direction of flow of liquid; and two third electrodes each covered with a second bubble hold area formed in the insulating region at each end of the width of the flow passage defining face so as to neighbor the second neighboring region and not to overlap the flow passage area in the direction of flow of liquid.

In the case that an electrode is insulated by an insulating film from conductive liquid, the contact angle between the surface of the insulating film and the liquid decreases when a voltage is applied between the electrode and the liquid. That is, a phenomenon arises in which the liquid-repellent of the surface of the insulating film apparently reduces in comparison with a state wherein no voltage is applied between the electrode and the liquid, which phenomenon is so-called the electro wetting phenomenon, for example, see JP-A-2003-177219. In the above-described liquid transfer devices and heads, when a voltage is applied between the liquid and the first or second electrode, the contact angle of the liquid decreases on the flow passage area or the first bubble hold area, and in addition, the second bubble hold area if a voltage is also applied between the liquid and the third electrode, and the liquid-repellent of the area reduces in comparison with a state wherein no voltage is applied between the liquid and the electrode. In the case that pressurized conductive liquid is supplied into the liquid flow passage, the liquid can move on the area when the applied voltage exceeds a predetermined value. Gas exists within the liquid flow passage, and the gas exists on the area when no voltage is applied between the flow passage area or the first bubble hold area and the liquid-repellent of the area is high. Therefore, when a voltage of the predetermined value or more is applied between the flow passage area and the liquid and no voltage is applied between the first bubble hold area and the liquid, the liquid flow passages falls in the first state wherein gas is held on the first bubble hold area so as to be able to transfer the liquid on the flow passage area. On the other hand, when a voltage of the predetermined value or more is applied between the first bubble hold area and the liquid and no voltage is applied between the flow passage area and the liquid, the liquid flow passage falls in the second state wherein the liquid flow passage is closed by a meniscus formed such that the first bubble hold area is covered with the liquid and the flow passage area is covered with no liquid. That is, when the liquid flow passage is changed over between the two states, gas moves in the liquid flow passage accordingly, and a meniscus is produced or disappears. Thus, according to the present invention, a liquid transfer device and a liquid transfer head, simple in construction and low in manufacturing cost, can be obtained.

BRIEF DESCRIPTION OF THE DRAWINGS

Other and further objects, features and advantages of the invention will appear more fully from the following description taken in connection with the accompanying drawings in which.

DESCRIPTION OF THE PREFERRED EMBODIMENTS

Hereinafter, an embodiment of the present invention will be described. The embodiment is an example in which the present invention is applied to a printer that transfers ink onto a record paper to print.

Figure 1:
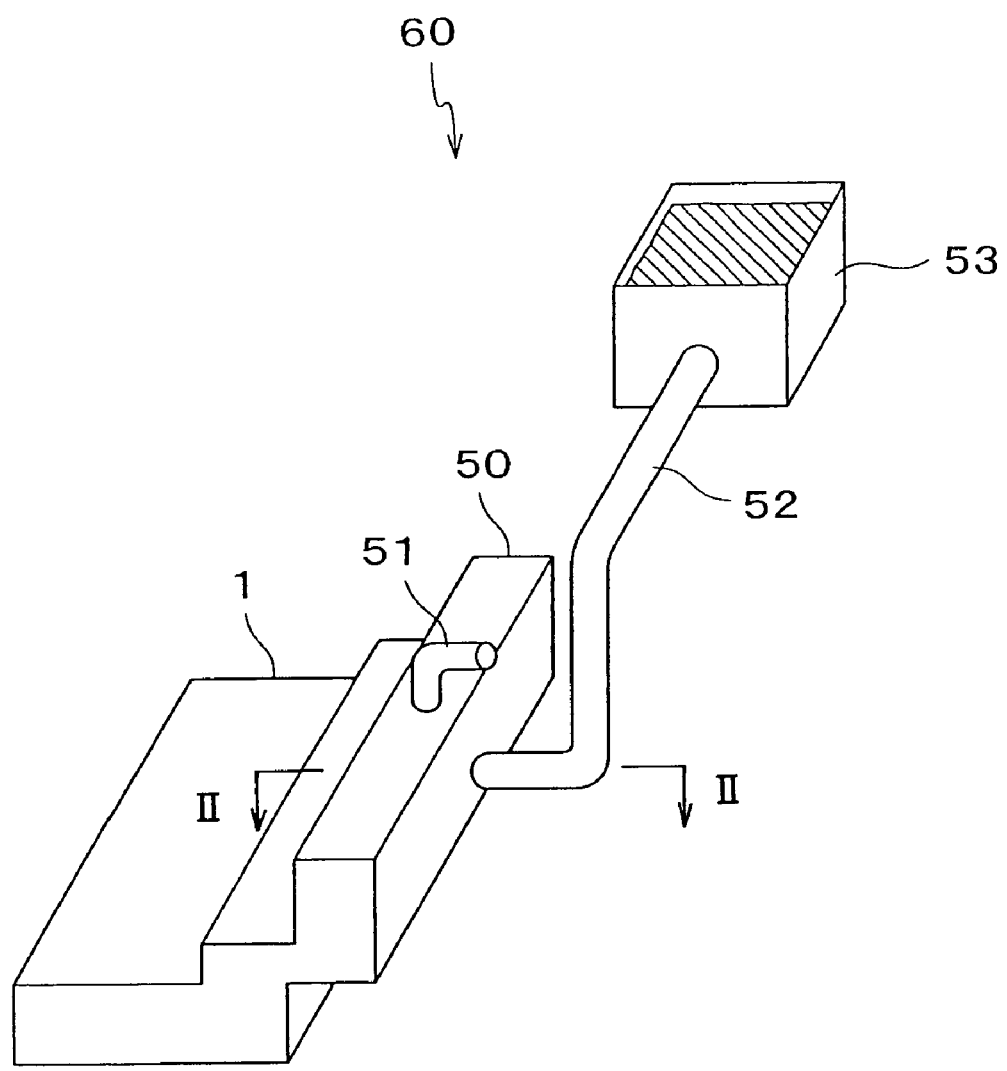
FIG. 1 is a perspective view showing a general construction of a printer according to an embodiment of the present invention.
Figure 3:
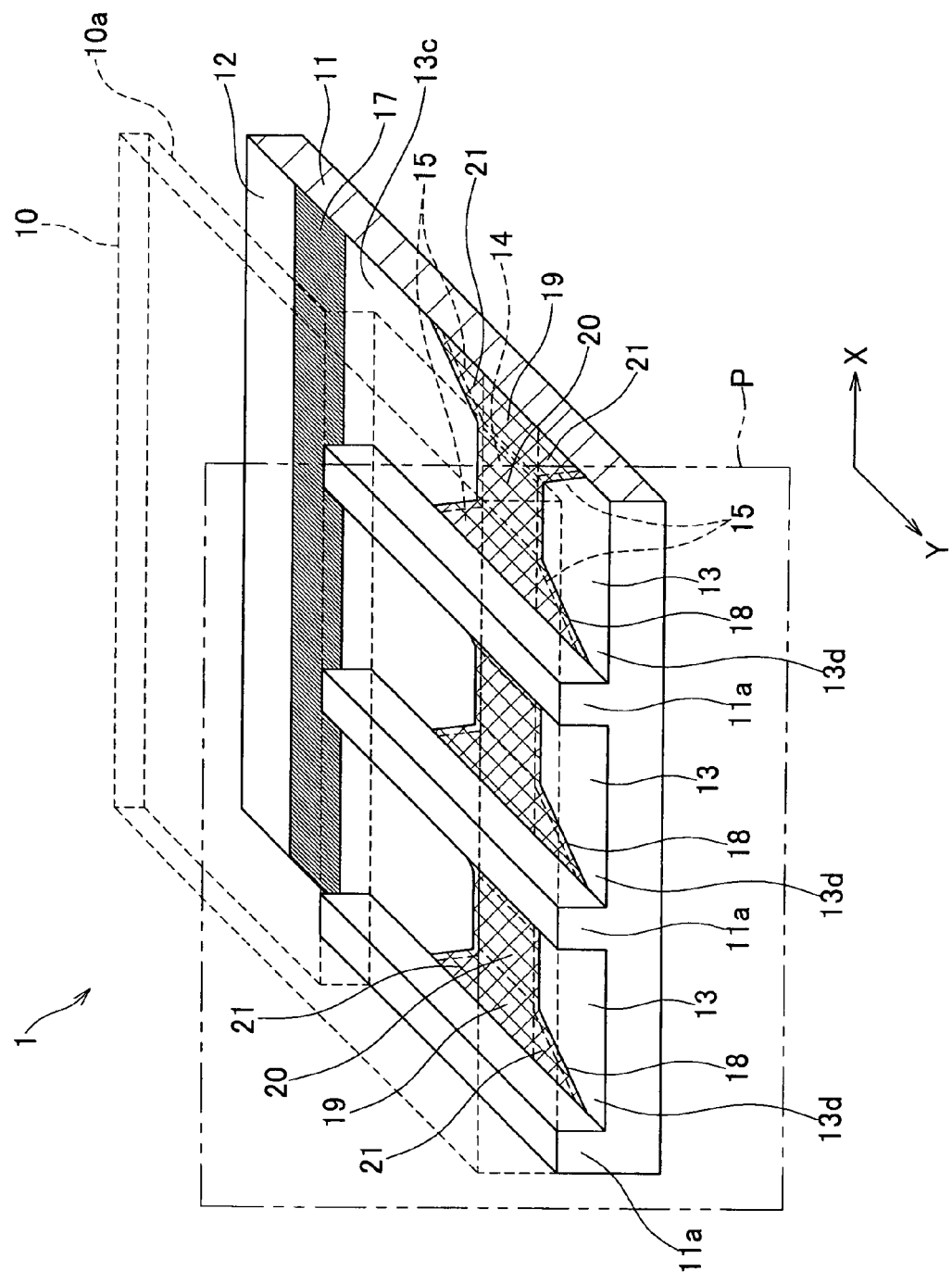
FIG. 3 is a perspective view of a principal part of a print head of the printer.
Figure 6:
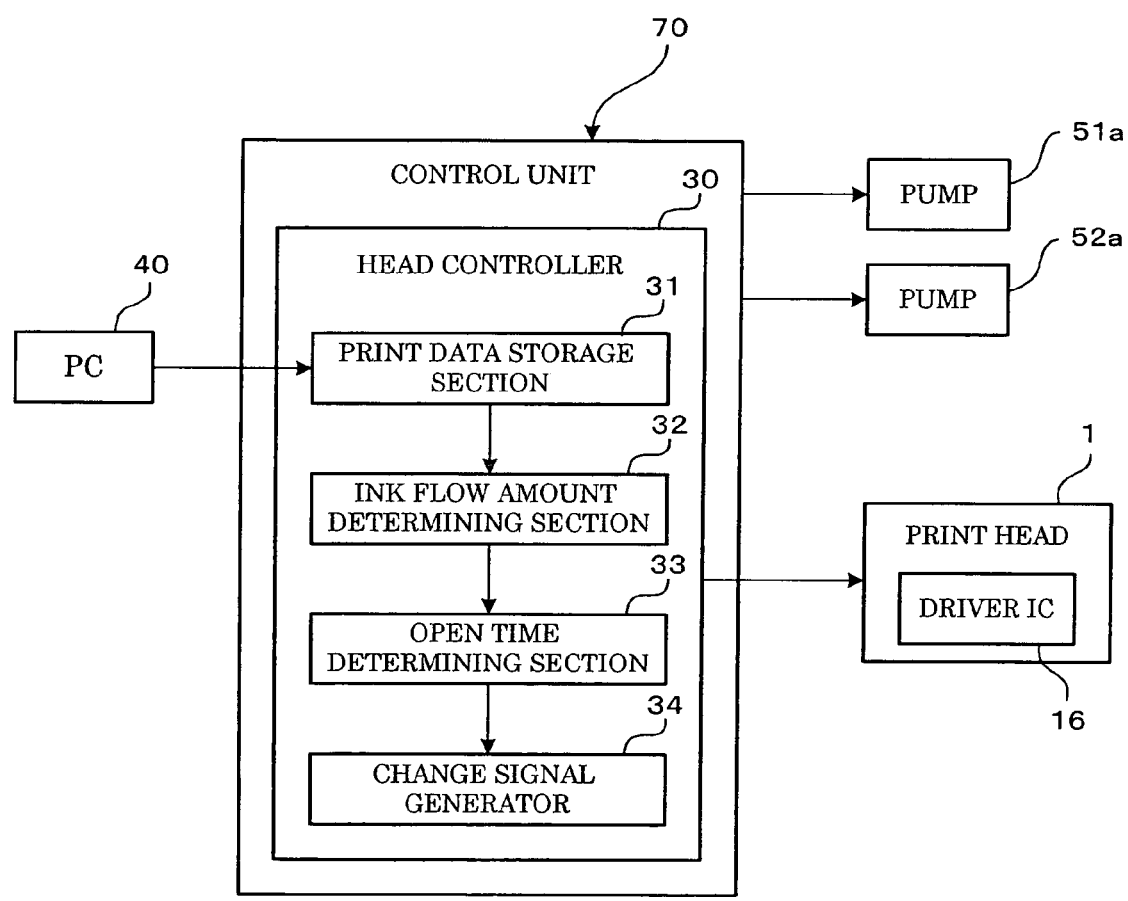
FIG. 6 is a block diagram showing an electrical construction of the printer.

As shown in FIG. 1, a printer 60 of this embodiment includes an ink tank 50 for storing ink supplied from an ink cartridge 53; a print head 1 for transferring ink onto a record paper P to print, as shown in FIG. 3; and a controller 70 for controlling various operations of the printer 60, such as a conveyance operation for the record paper P by a not-shown paper conveyance mechanism and a printing operation by the print head 1 with ink I, as shown in FIG. 6. An ink supply tube 52 connects the ink cartridge 53 to the ink tank 50. The ink tank 50 is provided with an air supply tube 51 for supplying air into the ink tank 50. The ink I to be transferred onto the record paper P by the print head 1 is conductive ink.

Figure 2:
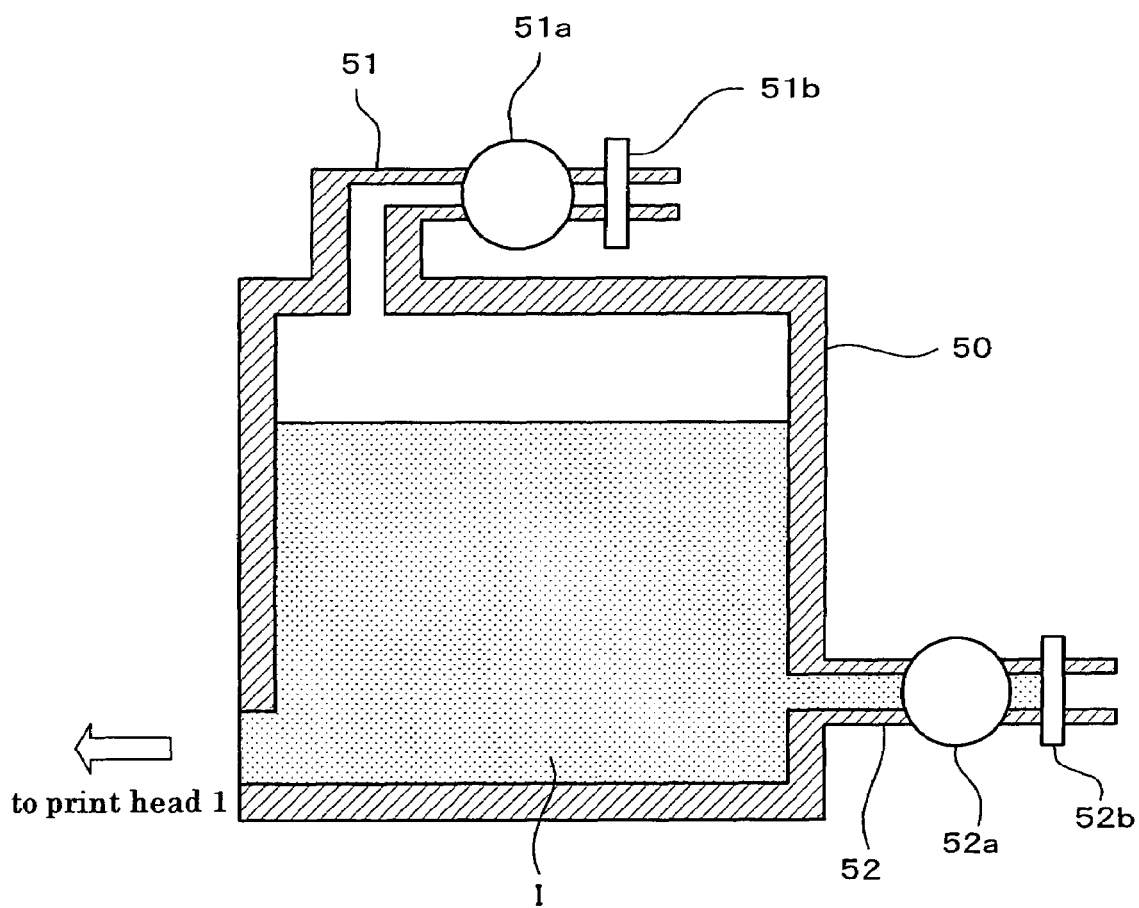
FIG. 2 is a sectional view taken along line II-II in FIG. 1.

As shown in FIG. 2, the ink supply tube 52 is provided with a pump 52a for supplying ink from the ink cartridge 53 to the ink tank 50; and a valve 52b capable of opening/closing the ink flow passage in the ink supply tube 52. The air supply tube 51 is provided with a pump 51a for feeding air into the ink tank 50; and a valve 51b capable of opening/closing the air flow passage in the air supply tube 51. When the print head 1 operates to print on the record paper P, the valve 52b of the ink supply tube 52 is closed, and the valve 51b of the air supply tube 51 is opened. In this state, air is fed into the ink tank 50 by the pump 51a, and thereby the ink in the ink tank 50 is pressurized to be driven to the print head 1. At this time, the pump 51a periodically somewhat varies the quantity of air to be supplied, and thereby varies the pressure of the air for pressurizing the ink in the ink tank 50. When the ink tank 50 is required to be filled up with ink I, the valve 51b of the air supply tube 51 is closed, and the valve 52b of the ink supply tube 52 is opened. In this state, ink I is supplied from the ink cartridge 53 by the pump 52a.

Figure 4:
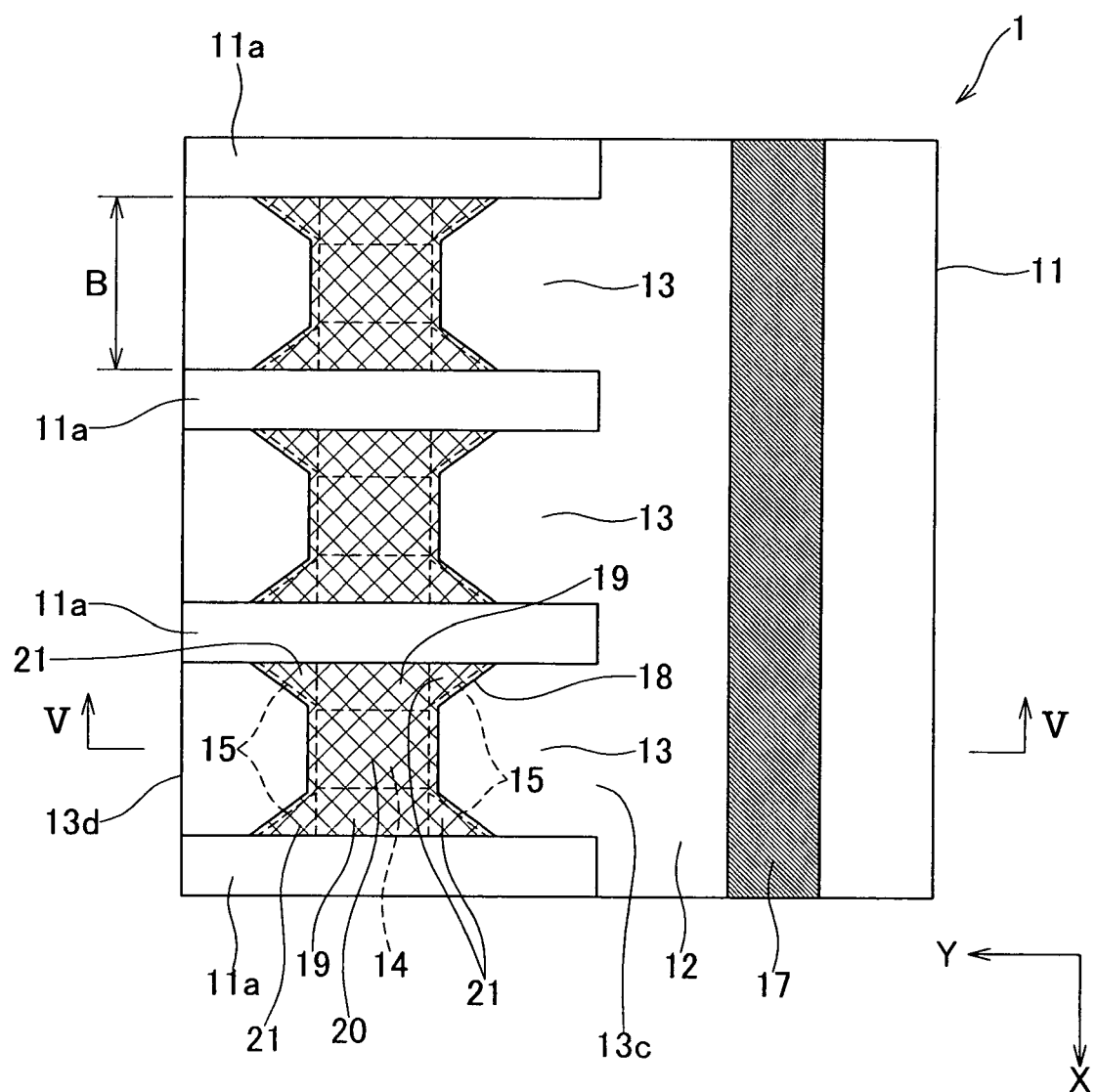
FIG. 4 is a cross sectional view of the print head.
Figure 5:
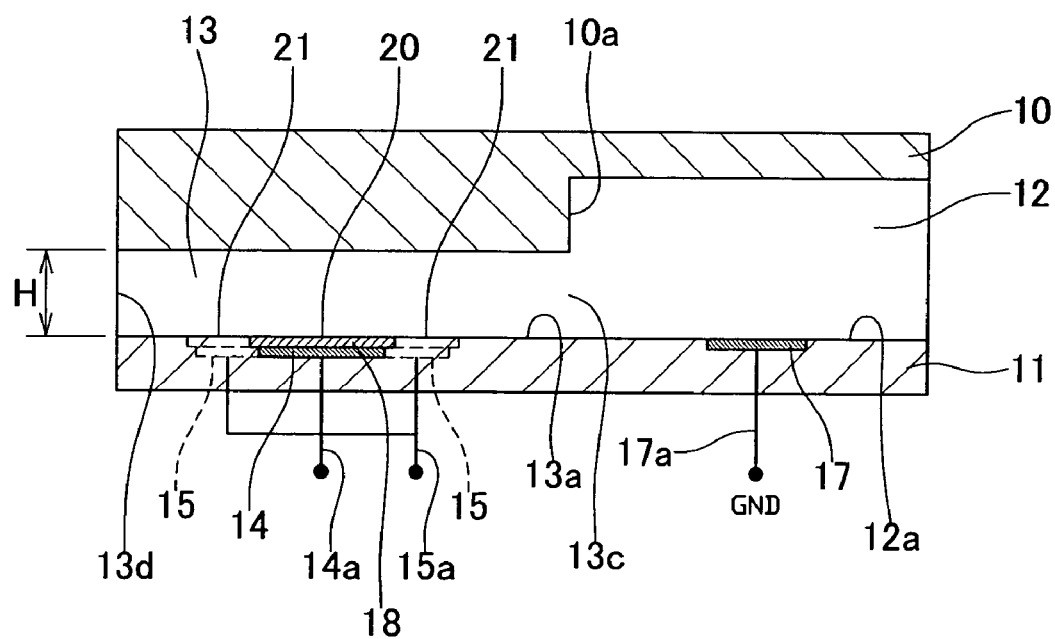
FIG. 5 is a sectional view taken along line V-V in FIG. 4.

Next, the print head 1 will be described with reference to FIGS. 3 to 5. FIG. 3 is a perspective view of a principal part of the print head 1. FIG. 4 is a cross sectional view of the print head 1. FIG. 5 is a sectional view taken along line V-V in FIG. 4. In FIGS. 3 and 4, a longitudinal direction of the print head 1 may be referred to as an X direction, and a width direction of the print head 1 may be referred to as a Y direction.

As shown in FIGS. 3 to 5, the print head 1 includes a rectangular first flow passage formation member 10 and a rectangular second flow passage formation member 11. The first and second flow passage formation members 10 and 11 are bonded to each other in a state of being opposed to each other. In this embodiment, either of the first and second flow passage formation members 10 and 11 is made of an insulating material such as a glass material or polyimide. However, the first and second flow passage formation members 10 and 11 may not always be made of such an insulating material if they are not brought into electrical contact with electrodes as will be described later. For example, they may be made of silicon, and $SiO_2$ may be formed on, at least, part of the surfaces of them, including a face on which electrodes are formed.

A rectangular recess 10a extending in an X direction is formed at one end portion in a Y direction of the first flow passage formation member 10, as shown in the right half portions of FIGS. 4 and 5. A plurality of partitions 11a extending in the Y direction are formed at the other end portion in the Y direction of the second flow passage formation member 11, as shown in the left half portions of FIGS. 4 and 5. The rectangular recess 10a of the first flow passage formation member 10 cooperates with the second flow passage formation member 11 to define a manifold flow passage 12 extending in the X direction, and the plurality of partitions 11a of the second flow passage formation member 11 cooperate with the first flow passage formation member 10 to define a plurality of ink flow passages 13 extending in the Y direction, branched from the manifold flow passage 12. Although FIGS. 3 and 4 show only three ink flow passages 13, actually, more than three ink flow passages 13 are arranged in the X direction at regular intervals. Ink I pressurized by the pump 51a and having flowed from the ink tank 50 into the print head 1, is supplied from the manifold flow passage 12 to the respective ink flow passages 13 through supply openings 13c of the ink flow passages 13, and then transferred onto a record paper P through discharge openings 13d of the ink flow passages 13. The record paper P is vertically moved by a not-shown paper feed mechanism in front of the print head 1 of FIG. 3. Each ink flow passage 13 has a rectangular cross section. In this embodiment, the width B of each ink flow passage 13, as shown in FIG. 4, is about 70 micrometers, and the height H of each ink flow passage 13, as shown in FIG. 5, is about 20 micrometers.

An insulating film 18 is provided on a substantially central region in a longitudinal direction, i.e., in a Y direction, of the bottom surface 13a of each ink flow passage 13. The region where the insulating film 18 is provided, is made up of a flow passage area 20, four bubble hold areas 21, and two high liquid-repellent areas 19. The flow passage area 20 has a rectangular shape in plane, extending in a Y direction, and it is disposed at a central region in a width direction, i.e., an X direction, of the bottom surface 13a of each ink flow passage 13, so as to cover a first individual electrode 14, as a first electrode. Each bubble hold area 21 has a right-angled triangular shape, and they are disposed at both end potions in width direction, i.e., an X direction, of the bottom surface 13a of each ink flow passage 13. The bubble hold areas 21 are connected to respective four corners of the rectangular flow passage area 20 so as to cover four second individual electrodes 15, as second and third electrodes. Each high liquid-repellent area 19 is surrounded by the flow passage area 20 and two bubble hold areas 21. The high liquid-repellent area 19 covers no electrode. As shown in FIG. 4, the flow passage area 20 and the four bubble hold areas 21 are arranged on the bottom surface 13a of each ink flow passage 13 in the order of two bubble hold areas 21, the flow passage area 20, and two bubble hold areas 21 in the direction of flow of ink I, i.e., in the direction from the right toward the left in FIG. 4. The flow passage area 20 and the bubble hold areas 21 are arranged so that the flow passage area 20 does not overlap any bubble hold area 21 when viewing from the direction of flow of ink I.

As shown in FIG. 4, as for two of the four second individual electrodes 15 disposed upstream in the direction of flow of ink I, their oblique sides disposed inside in a width direction, i.e., an X direction, extend so as to gradually get near to the first individual electrode 14 in the direction of flow of ink I. That is, each of the two second individual electrodes 15 is formed into a shape that gradually gets near to the first individual electrode 14 in the direction of flow of ink I. On the other hand, as for two of the four second individual electrodes 15 disposed downstream in the direction of flow of ink I, their oblique sides disposed inside in a width direction, i.e., an X direction, extend so as to gradually get apart from the first individual electrode 14 in the direction of flow of ink I. That is, each of the two second individual electrodes 15 is formed into a shape that gradually gets apart from the first individual electrode 14 in the direction of flow of ink I. Because the first individual electrode 14 and four second individual electrodes 15 are formed on a surface of the second flow passage formation member 11 that provides the bottom surface 13*a* of each ink flow passage 13, they can be formed on the surface of the second flow passage formation member 11 at once by a know method such as a vapor deposition method, a sputtering method, or a printing method. This makes it easy to form the electrodes.

The first individual electrode 14 and four second individual electrodes 15 are electrically connected to a driver IC 16 as shown in FIG. 6, through wires 14*a* and 15*a*, respectively. The first individual electrode 14 or the four second individual electrodes 15 are supplied with a potential signal from the driver IC 16 on the basis of a signal from a head controller 30 as shown in FIG. 6. The potential signal is a pulse signal that alternately takes the ground potential and a predetermined positive potential. The value of the positive potential of the potential signal supplied from the driver IC 16 is set to be not less than a predetermined value that causes the electrowetting phenomenon as will be described later.

A common electrode 17, as a fourth electrode, extending in an X direction, is provided on the bottom surface 12*a* of the manifold flow passage 12. The common electrode 17 is always grounded through a wire 17*a*. Conductive ink I within the print head 1 is always kept at the ground potential by being in contact with the common electrode 17. Like the first and second individual electrodes 14 and 15, the common electrode 17 also can be formed on the surface of the second flow passage formation member 11 by a know method such as a vapor deposition method, a sputtering method, or a printing method.

Figure 8:
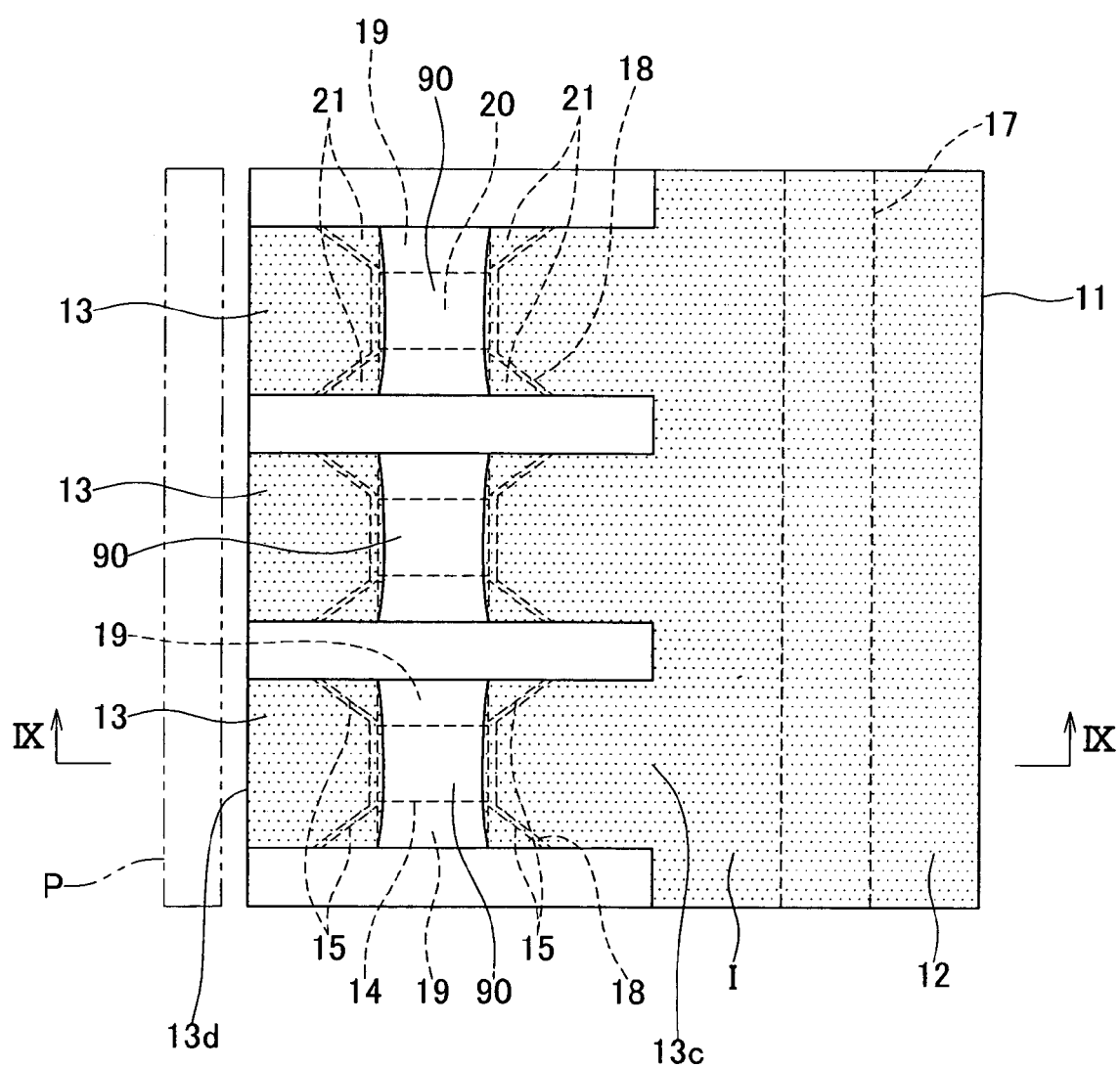
FIG. 8 is a cross sectional view of the print head in a state wherein a flow passage is closed.
Figure 9:
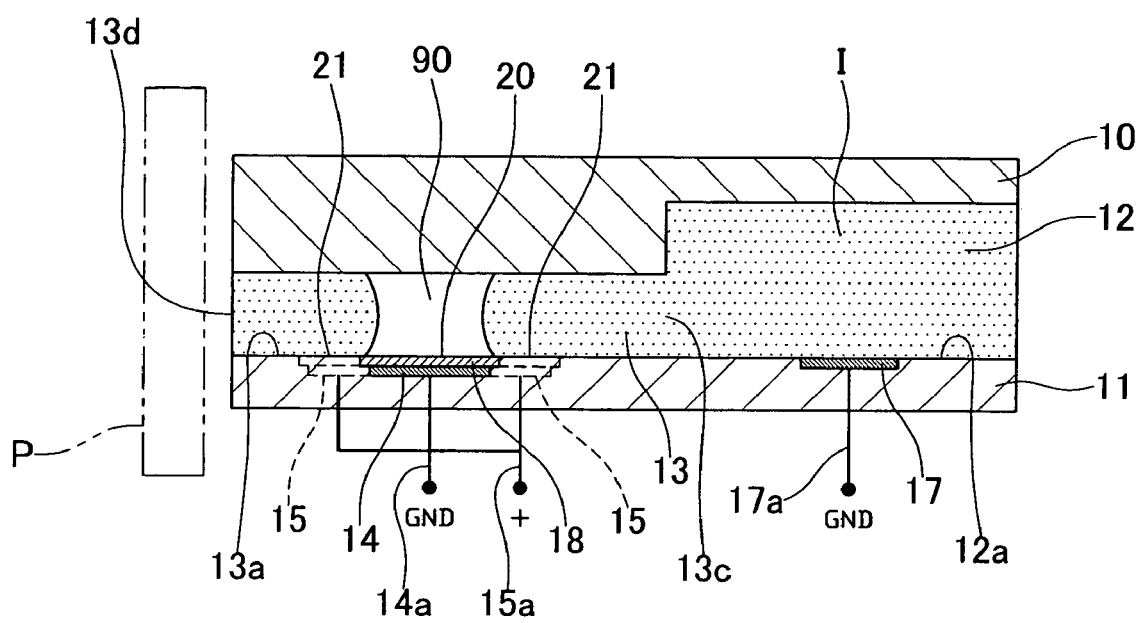
FIG. 9 is a sectional view taken along line IX-IX in FIG. 8.
Figure 10:
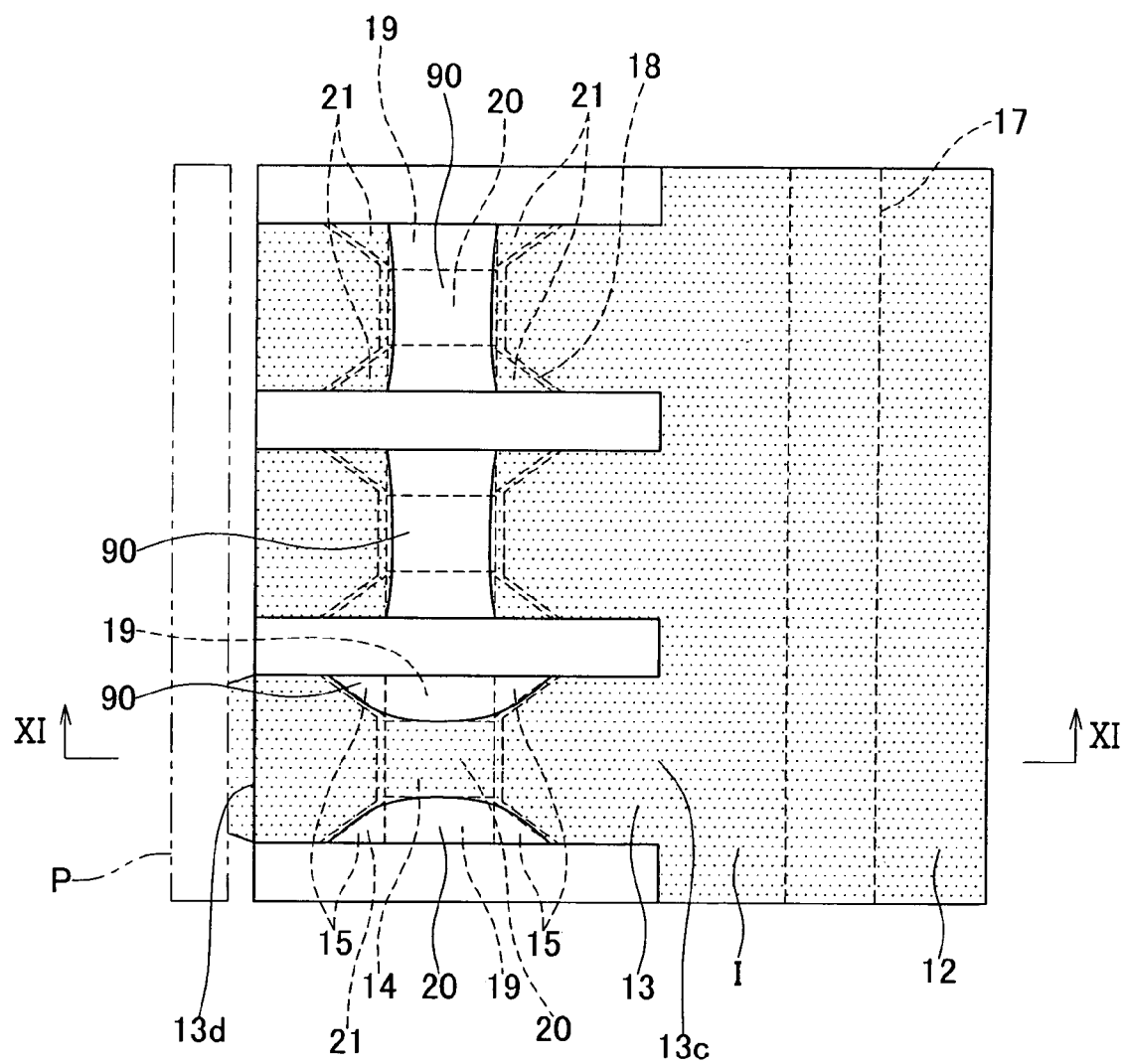
FIG. 10 is a cross sectional view of the print head in a state wherein part of the flow passage is opened.

The liquid-repellent of the insulating film 18 is higher than that of the region of the inner surface of each ink flow passage 13 other than the region where the insulating film 18 is provided. In this high liquid-repellent state, ink I can not move onto the surface of the insulating film 18. Instead, an air bubble 90, as gas, as shown in FIGS. 8 to 10, exists on the surface of the insulating film 18.

When the driver IC 16 controls the potentials of the first and second individual electrodes 14 and 15 to generate a difference in potential between the electrodes and ink I that is being kept at the ground potential, however, this decreases the contact angle of the ink I with the surface of the insulating film 18, and as a result, the liquid-repellent of the insulating film 18 lowers in comparison with a state wherein there is no difference between the electrodes and the ink I, which is called the electro wetting phenomenon. When part of a droplet of ink I is in contact with a high liquid-repellent region and the other part of the droplet is in contact with a low liquid-repellent region, the droplet tends to move so that it is only on the low liquid-repellent region. Therefore, ink can move onto the surface of the insulating film 18 on the electrodes that have been controlled to be at a predetermined positive potential. Thus, as will be described later, by supplying potential signals to the respective first and second individual electrodes 14 and 15, the ink flow passage 13 can be opened. Such an insulating film 18 can be formed by, for example, coating with a fluoric resin by a spin coating method. In this embodiment, the thickness of the insulating film 18 is about 0.1 micrometers.

Because ink I is in contact with the common electrode 17 and thereby kept at the ground potential, this increases the potential difference between the ink I and an electrode of the first and second individual electrodes 14 and 15 that has been controlled to be at a positive potential, and the liquid-repellent of the portion of the insulating film 18 on the surface of the electrode surely lowers.

As for the high liquid-repellent area 19, the liquid-repellent of the insulating film 18 is always high because no electrode to be supplied with a potential signal exists below the portion of the insulating film 18. Therefore, a bubble 90 always exists on the high liquid-repellent area 19. As shown in FIG. 4, the flow passage area 20 and the high liquid-repellent area 19 neighbor each other in an X direction, i.e., along the width of the ink flow passage 13, and they occupy the whole width of the bottom surface 13*a* of the ink flow passage 13. On the other hand, the bubble hold areas 21 and the high liquid-repellent area 19 neighbor each other in a Y direction, i.e., the direction of flow of ink I, and they occupy only both end portions in a width direction of the bottom surface 13*a*.

Next, an electrical construction of the printer 60 of this embodiment will be described with reference to the block diagram of FIG. 6.

A control unit 70 includes therein a CPU (Central Processing Unit), a ROM (Read Only Memory), a RAM (Random Access Memory), and so on. The ROM stores therein various programs and data for controlling the whole operation of the printer 60. The RAM temporarily stores therein data to be processed by the CPU. The control unit 70 controls the pump 51*a* of the air supply tube 51 to feed ink to the print head 1, or controls the pump 52*a* of the ink supply tube 52 to supply ink into the ink tank 50. Further, the control unit 70 controls a not-shown paper conveyance mechanism to convey a record paper P. The control unit 70 includes a head controller 30 for controlling the operation of printing on the record paper P by the print head 1. The head controller 30 is constituted by functions of the CPU, ROM, RAM, and so on, in the control unit 70. The head controller 30 controls potential signals to be supplied to the respective first and second individual electrodes 14 and 15 by the driver IC 16, so as to open/close each ink flow passage 13 individually.

As shown in FIG. 6, the head controller 30 includes a print data storage section 31 for storing print data input from a personal computer (PC) 4; an ink flow amount determining section 32 for determining the flow amount of ink I flowing in an ink flow passage 13, on the basis of the print data stored in the print data storage section 31; an open time determining section 33 for determining the time period during which the ink flow passage 13 is in an open state, on the basis of the flow amount of ink I determined by the ink flow amount determining section 32; a change signal generator 34 for generating an instruction signal instructing the driver IC 16 to change the potential of the potential signal to be supplied to each electrode, i.e., each of the first and second individual electrodes 14 and 15, by the driver IC 16.

Figure 7:
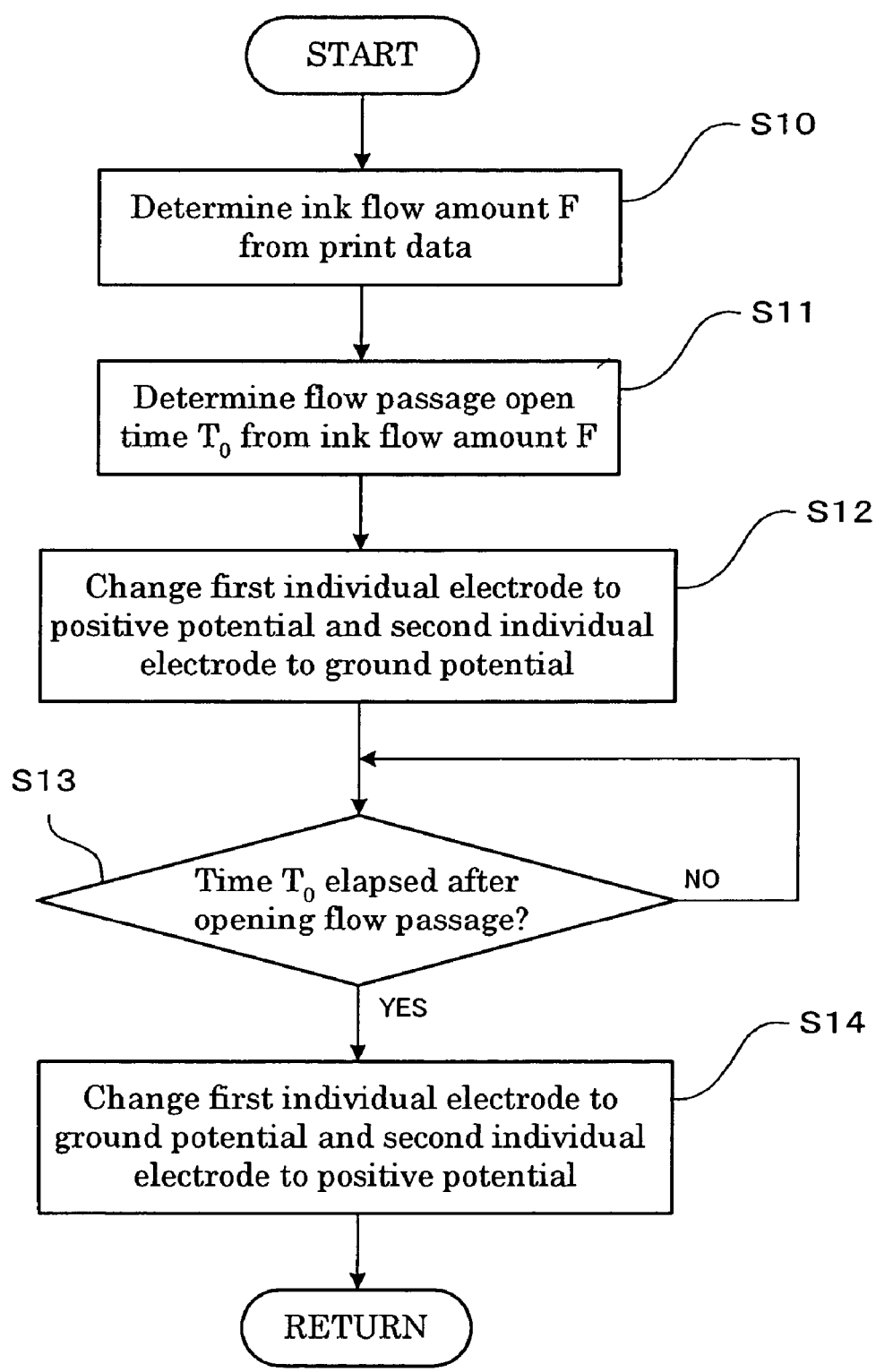
FIG. 7 is a flowchart of a flow passage opening/closing process.
Figure 11:
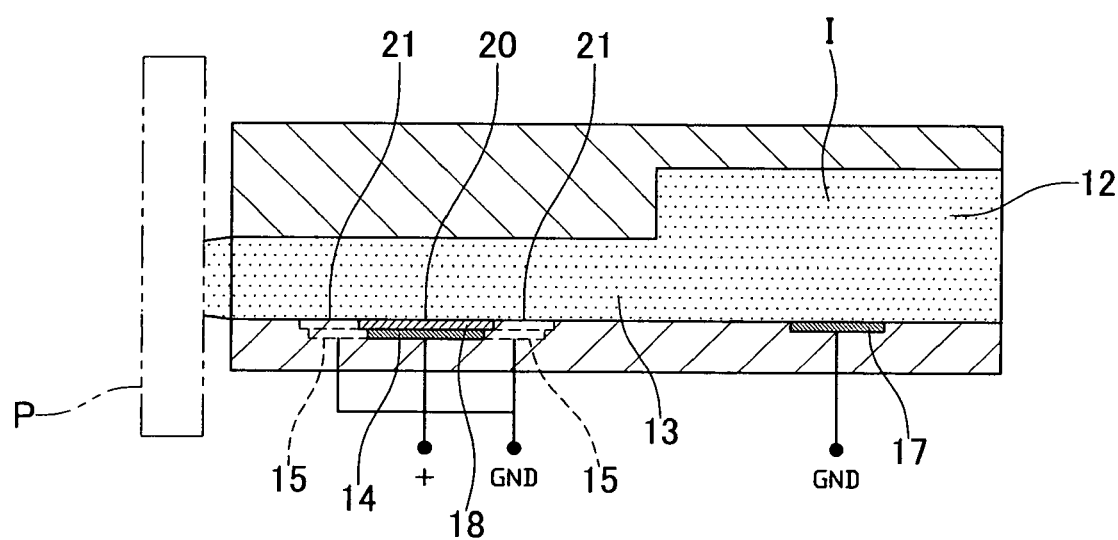
FIG. 11 is a sectional view taken along line XI-XI in FIG. 9.

A flow passage opening/closing process to be executed by the head controller 30 will be described with reference to the flowchart of FIG. 7 and FIGS. 8 to 11. The flow passage opening/closing process is executed when ink I is transferred onto a record paper P through ink flow passages 13 on the basis of print data input from the PC 40. In FIG. 7, Si (i=10, 11, 12, . . . ) represents the number of each step of the process. In FIGS. 9 and 11, "+" of the node of the wire 14*a* or 15*a* connected to the first or second individual electrode 14 or 15 represents a state wherein the potential signal supplied to the electrode 14 or 15 is at a positive potential, and "GND" represents a state wherein the potential signal supplied to the electrode 14 or 15 is at the ground potential.

As shown in FIGS. 8 and 9, no ink I is transferred in any ink flow passage 13, the potential signals supplied to the four second individual electrodes 15 of the ink flow passage 13 are at a positive potential, and the potential signal supplied to the first individual electrode 14 is kept at the ground potential. In this state, the liquid-repellent of the bubble hold areas 21 of the insulating film 18 covering the respective second individual electrodes 15, is low. Therefore, ink I can move on the surface of the insulating film 18 at each bubble hold area 21. Contrastingly, the liquid-repellent of the flow passage area 20 of the insulating film 18 covering the first individual electrode 14, is high, and thus, no ink I can move on the surface of the insulating film 18 at the flow passage area 20. Because the liquid-repellent of each high liquid-repellent area 19 surrounded by the flow passage area 20 and bubble hold areas 21, is always high irrespective of the potentials of the first and second individual electrodes 14 and 15, no ink I can move on the high liquid-repellent area 19. Thus, a meniscus is formed so that the flow passage area 20 and high liquid-repellent areas 19 are covered with no ink I. As a result, an air bubble 90 is formed over the flow passage area 20 of the surface of the insulating film 18, and two high liquid-repellent areas 19 neighboring the flow passage area 20 at both ends of the flow passage area 20 in a width direction of the ink flow passage 13. In this state, the bubble 90 stops, i.e., closes, the ink flow passage 13. Because the flow passage area 20 and high liquid-repellent areas 19 occupy the whole width of the ink flow passage 13, as described above, the bubble 90 divides ink into two parts, and thus, the ink flow passage 13 is surely closed.

In a state wherein each flow passage 13 is thus closed by a bubble 90, a case wherein the lowermost ink flow passage 13 in FIG. 8 is opened to transfer ink I through the ink flow passage 13, will be described. As shown in FIG. 7, first, in Step S10, on the basis of print data stored in the print data storage section 31, the ink flow amount determining section 32 determines the flow amount F of ink I to flow in the ink flow passage 13, that is, the amount of ink I to be transferred onto a record paper P through the ink flow passage 13. Next, in Step S11, on the basis of the ink flow amount F determined by the flow amount determining section 32, the open time determining section 33 determines a flow passage open time $T_O$ for the ink flow passage 13 in consideration of various conditions, such as the cross section and the length of the ink flow passage 13, the viscosity and the pressure of ink I, and so on. As a matter of course, the larger the flow amount F, the longer the flow passage open time $T_O$ determined.

The change signal generator 34 generates an instruction signal to instruct the driver IC 16 to change the potential signal being supplied to the first individual electrode 14, into a positive potential, and the potential signal being supplied to each of the four second individual electrodes 15, into the ground potential. The driver IC 16 having received the instruction signal, changes the potential of the first individual electrode 14 from the ground potential into the positive potential, and the potential of each second individual electrode 15 from the positive potential into the ground potential, in Step S12. As a result, in the flow passage area 20 of the insulating film 18 covering the first individual electrode 14, the contact angle with ink I decreases to lower the liquid-repellent there. Thus, ink I can move on the surface of the insulating film 18 at the flow passage area 20. On the other hand, the liquid-repellent of the bubble hold areas 21 of the insulating film 18 covering the second individual electrodes 15, becomes high. Therefore, as shown in FIGS. 10 and 11, ink I moves on the flow passage area 20, and simultaneously with this, the bubble 90 having existed on the flow passage area 20 to close the ink flow passage 13, is divided into two bubbles, which move toward both ends of the width of the ink flow passage 13. The divided bubbles 90 are thus on the surface of the insulating film 18 at the bubble hold areas 21 and high-repellent areas 19. As a result, two regions of the ink flow passage 13 having been isolated by the bubble 90, are connected to each other, and thereby, the ink flow passage 13 is opened to transfer ink onto the record paper P. As described above, by the head controller 30 and the driver IC 16 controlling the potentials of the potential signals being supplied to the respective first and second individual electrodes 14 and 15, the ink flow passage 13 can be changed from a state of being closed, into a state of being opened to transfer ink I.

Because the flow passage area 20 and the bubble hold areas 21 are formed on the same inner face, i.e., the bottom surface 13a of the ink flow passage 13, the bubbles 90 are easy to move from the flow passage area 20 to the bubble hold areas 21. In addition, because the high liquid-repellent areas 19 are provided so as to neighbor the flow passage area 20 and the bubble hold areas 21 formed on the bottom surface 13a of the ink flow passage 13, the bubbles 90 move from the flow passage area 20 to the bubble hold areas 21 through the high liquid-repellent areas 19. This makes the bubbles 90 easier to move between the areas 20 and 21, and as a result, the sureness and responsibility of the flow passage opening operation become higher. Further, because such bubble hold areas 21 are provided in both of a region nearer to the supply opening 13c than the flow passage area 20, and a region nearer to the discharge opening 13d than the flow passage area 20, the bubbles 90 are still easier to move from the flow passage area 20 to the bubble hold areas 21 provided on both sides of the flow passage area 20, in the direction of flow of ink I. This makes the responsibility of the flow passage opening operation still higher.

The flow passage area 20 and the bubble hold areas 21 are arranged so as not to overlap each other in the direction of flow of ink I, and the bubble hold areas 21 and the high liquid-repellent areas 19 occupy only both end portions in a width direction of the ink flow passage 13. Therefore, no bubble 90 exists in a central portion in the width direction of the ink flow passage 13, and thus, ink I surely flows downstream through the central portion of the ink flow passage 13. Further, as described above, each of two of four bubble hold areas 21 provided upstream in the direction of flow of ink I, is formed into a shape gradually getting near to the flow passage area 20 in the direction of flow of ink I, while each of two of four bubble hold areas 21 provided downstream in the direction of flow of ink I, is formed into a shape gradually getting apart from the flow passage area 20 in the direction of flow of ink I. Therefore, when the bubbles 90 move to the respective bubble hold areas 21, each bubble 90 is deformed into a shape that does not hinder the flow of ink. As a result, ink smoothly flows downstream through the flow passage area 20 in the central portion in the width direction of the ink flow passage 13.

When the predetermined open time $T_O$ determined by the open time determining section 33, elapses after the ink flow passage 13 is opened in Step S12, that is, Yes in Step S13, the change signal generator 34 generates an instruction signal for instructing the driver IC 16 to change the potential signal being supplied to the first individual electrode 14, into the ground potential, and the potential signals being supplied to the respective second individual electrodes 15, into a positive potential. In Step S14, the driver IC 16 having received the instruction signal, changes the potential of the first individual electrode 14 from the positive potential into the ground potential, and the potential of each second individual electrode 15 from the ground potential into the positive potential. Thus, because the liquid-repellent of the flow passage area 20 of the insulating film 18 covering the first individual electrode 14, again becomes high, ink I can not move on the surface of the insulating film 18 at the flow passage area 20. That is, as shown in FIGS. 8 and 9, the bubbles 90 move from the bubble hold areas 21 to the flow passage area 20, and the united bubble 90 stops, i.e., closes, the ink flow passage 13. As described above, by the head controller 30 and the driver IC 16 controlling the potentials of the potential signals being supplied to the respective first and second individual electrodes 14 and 15, the ink flow passage 13 can be changed from the state of being opened to transfer ink I, into the state of being closed. Even at the time of closing the flow passage, the bubbles 90 move from the bubble hold areas 21 to the flow passage area 20 through the high liquid-repellent areas 19. Therefore, the bubbles 90 are easy to move between the areas 20 and 21, and the sureness and responsibility of the flow passage closing operation are also high.

The above-described printer 60 brings about the following effects.

By the driver IC 16 controlling the potentials of the first and second individual electrodes 14 and 15 so as to move a bubble 90, which exists within the ink flow passage 13, between the flow passage area 20 of the insulating film 18 covering the first individual electrode 14, and the bubble hold areas 21 of the insulating film 18 covering the respective second individual electrodes 15, the ink flow passage 13 can be easily opened/closed. This flow passage opening/closing operation can be executed by a simple construction, and thus, the manufacturing cost of the printer 60 can be reduced.

Because the flow passage area 20 and the bubble hold areas 21 are formed on the same inner face, i.e., the bottom surface 13a of the ink flow passage 13, and further, two bubble hold areas 21 are formed in either of a region nearer to the supply opening 13c than the flow passage area 20, and a region nearer to the discharge opening 13d than the flow passage area 20, bubbles 90 move between the flow passage area 20 and the bubble hold areas 21 provided on both sides of the flow passage area 20 in the direction of flow of ink I, and therefore, the responsibility of the flow passage opening/closing operation is high. Further, because the high liquid-repellent areas 19 always high in the liquid-repellent are provided so as to neighbor the flow passage area 20 and the bubble hold areas 21 formed on the bottom surface 13a of the ink flow passage 13, and at the time of opening/closing the flow passage, bubbles 90 move between the flow passage area 20 and the bubble hold areas 21 through the high liquid-repellent areas 19, the bubbles 90 are easy to move between the areas 20 and 21, and this makes the sureness and responsibility of the flow passage opening/closing operation higher.

Ink I is in contact with the common electrode 17 to be always kept at the ground potential. Therefore, when one of the first and second individual electrodes 14 and 15 is set at a positive potential, a wide difference in potential between the electrode and ink I can be ensured, and the liquid-repellent of the portion of the insulating film 18 covering the electrode can be surely lowered. As a result, by lowering the positive potential to be supplied to the first and second individual electrodes 14 and 15 as much as possible, the ink flow passage 13 can be efficiently opened/closed.

The open time determining section 33 determines a flow passage open time $T_0$ on the basis of the ink flow amount determined by the ink flow amount determining section 32, and the ink flow passage 13 is opened only for the flow passage open time $T_0$. Therefore, by the open time determining section 33 controlling the flow passage open time $T_0$, a desired amount of ink I can be transferred onto a record paper P through the discharge opening 13d of the ink flow passage 13.

Next, modifications in which the above-described embodiment is variously modified, will be described. In the modifications, components having the same constructions as those of the embodiment are denoted by the same reference numerals as those of the embodiment, respectively, and the description thereof may be omitted.

Figure 12:
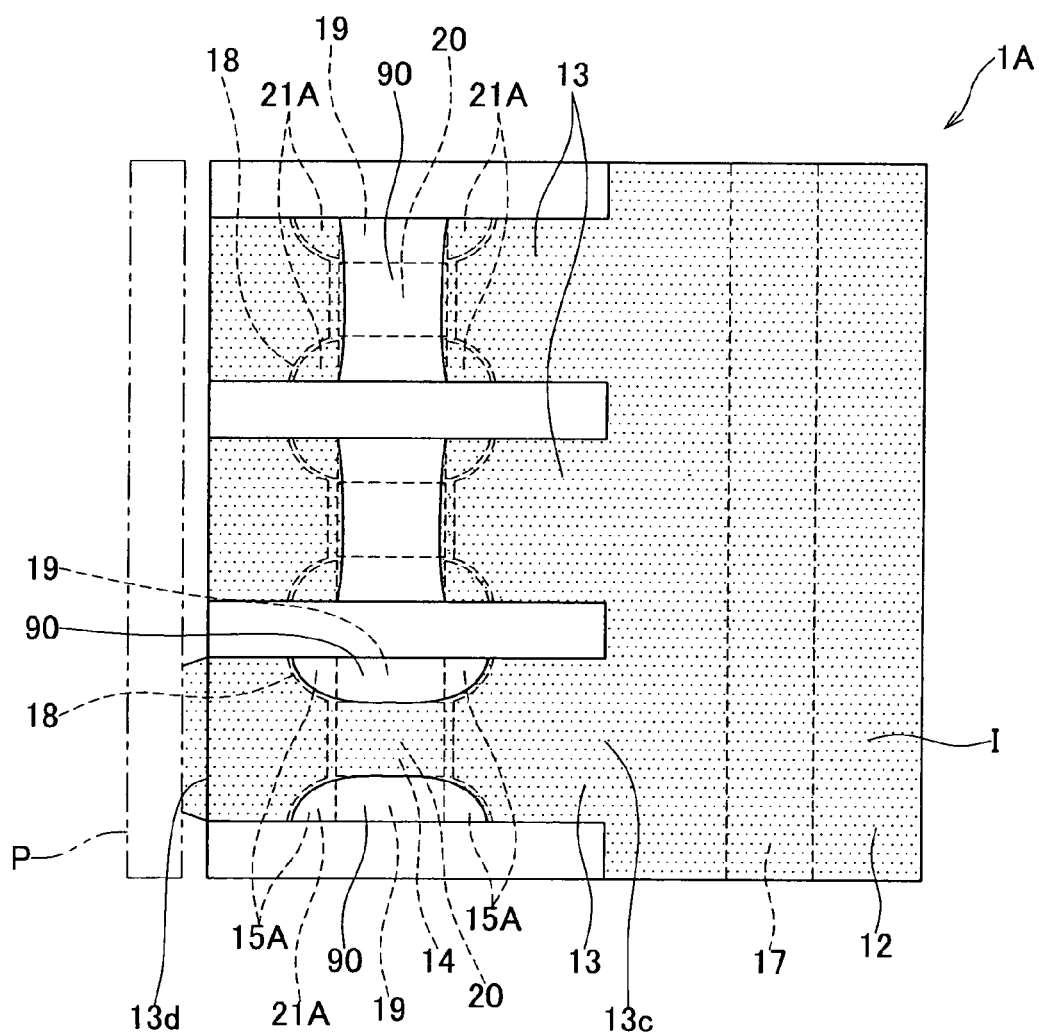
FIG. 12 is a cross sectional view of a print head according to modification 1 of the embodiment.

[1] The shape in plane of each bubble hold area covering a second individual electrode, is not limited to a right-angled triangular as in the embodiment. For example, as in a print head 1A of modification 1 shown in FIG. 12, each bubble hold area 21A of a quarter circular arc shape, covering a second individual electrode 15A, may be formed. Otherwise, each bubble hold area may be formed into a quarter elliptic arc shape, or into a substantially rectangular shape having a rounded corner inside in a width direction of the flow passage. In any case, the bubble hold area is preferably formed into a shape capable of deforming a bubble 90 so as not to hinder the flow of ink I.

Figure 13:
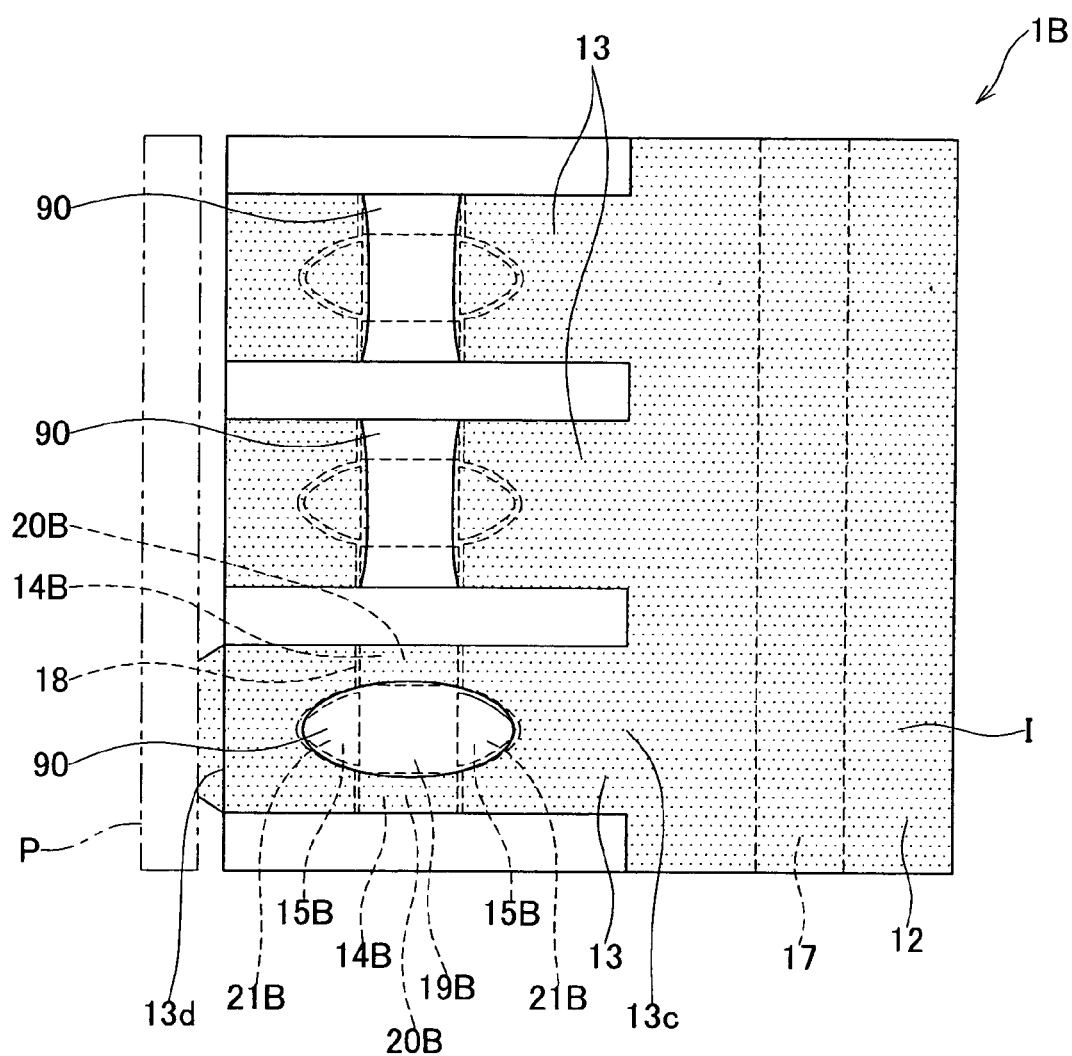
FIG. 13 is a cross sectional view of a print head according to modification 2 of the embodiment.
Figure 14:
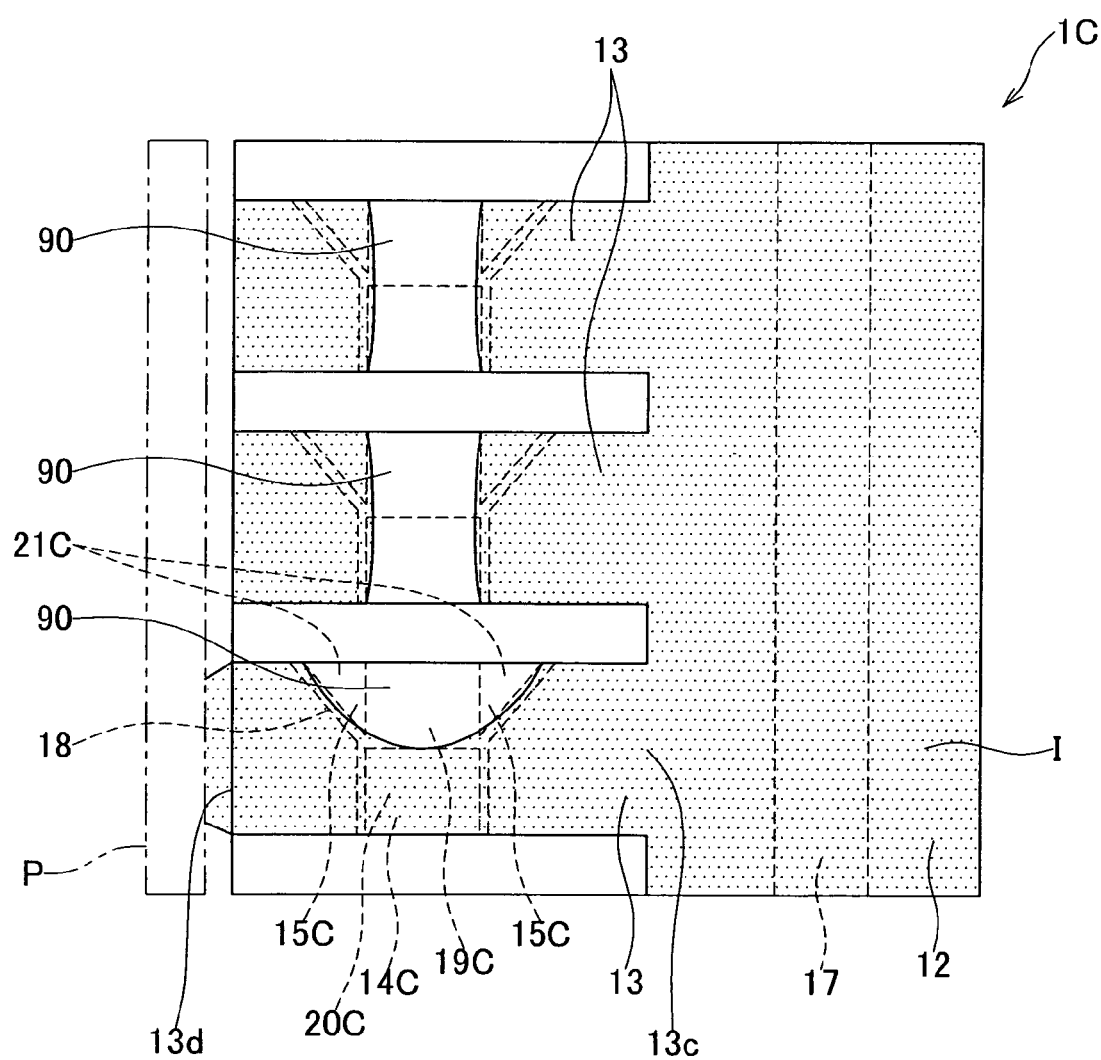
FIG. 14 is a cross sectional view of a print head according to modification 3 of the embodiment.

[2] As in a print head 1B of modification 2 shown in FIG. 13, flow passage areas 20B covering first individual electrodes 14B may be formed on both end portions in a width direction of the bottom surface 13a of each flow passage 13, and bubble hold areas 21B covering second individual electrodes 15B, and a high liquid-repellent area 19B, may be formed on a central portion in the width direction of the bottom surface 13a of the ink flow passage 13. Otherwise, as in a print head 1C of modification 3 shown in FIG. 14, a flow passage area 20C covering a first individual electrode 14C, may be formed only on one end portion in a width direction of the bottom surface 13a of each ink flow passage 13, i.e., on a lower end portion of the ink flow passage 13 in FIG. 14, and bubble hold areas 21C covering second individual electrodes 15C, and a high liquid-repellent area 19C, may be formed on the other end portion in the width direction of the bottom surface 13a of the ink flow passage 13, i.e., on an upper end portion of the ink flow passage 13 in FIG. 14.

Figure 15:
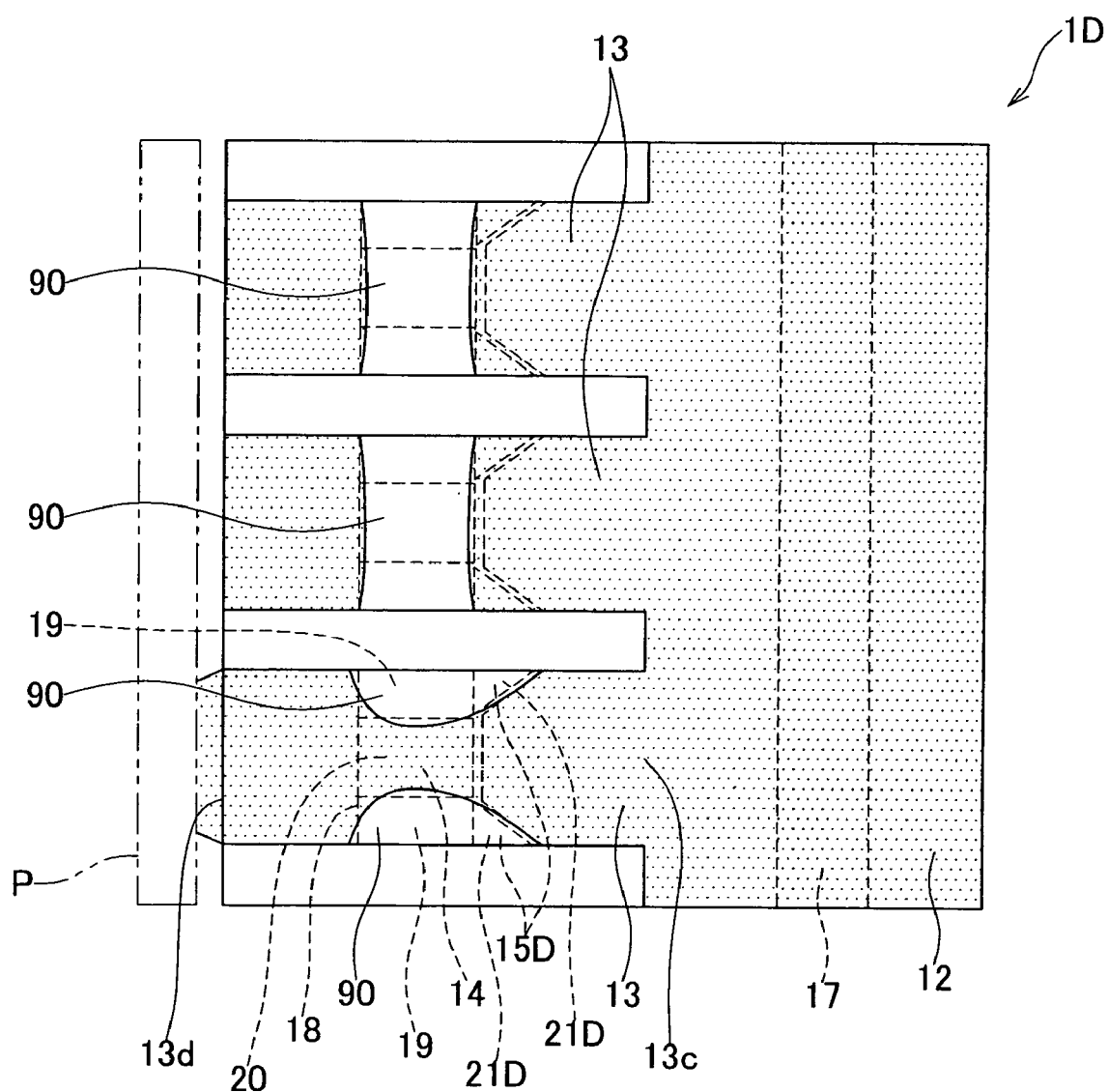
FIG. 15 is a cross sectional view of a print head according to modification 4 of the embodiment.
Figure 16:
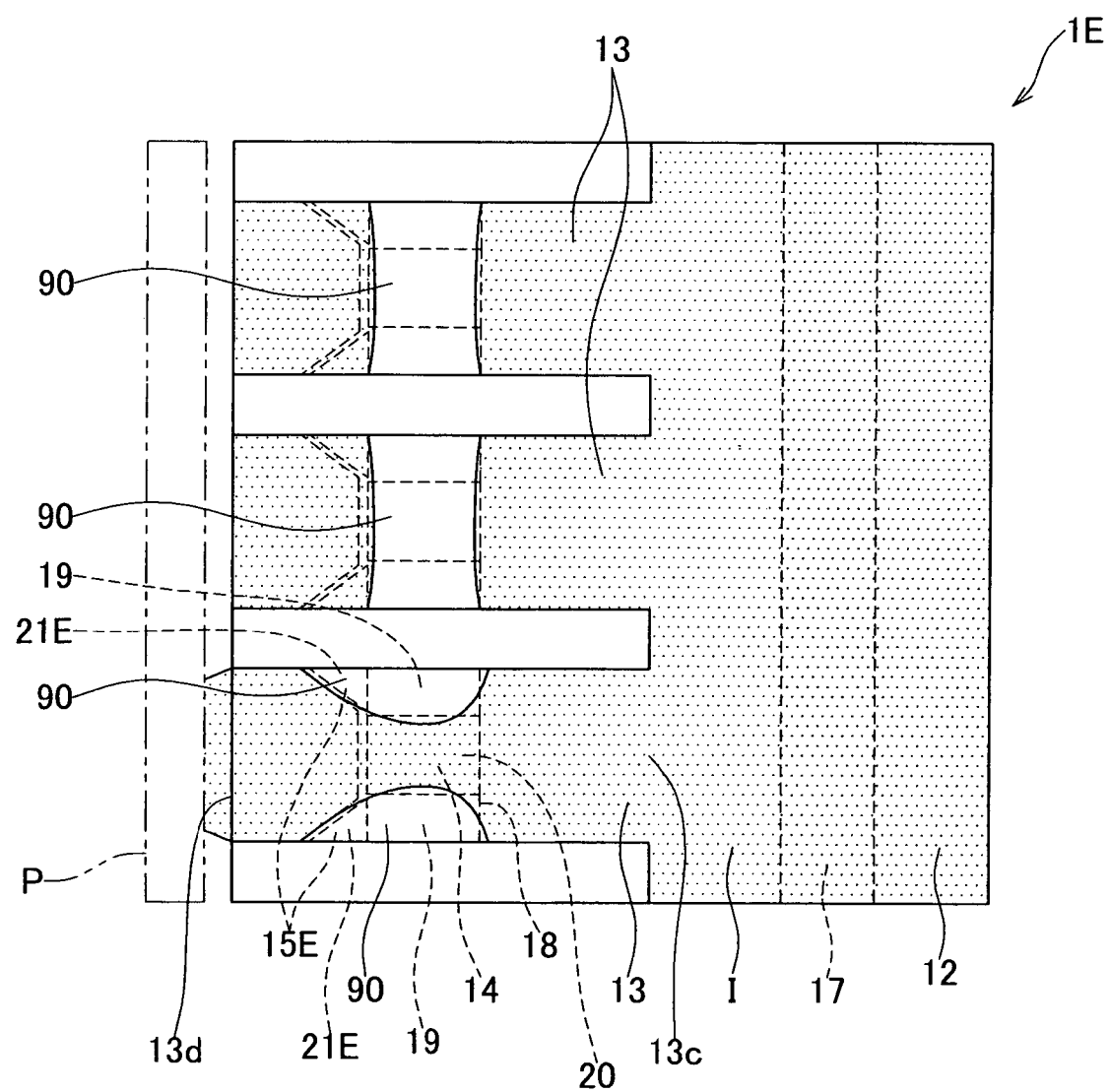
FIG. 16 is a cross sectional view of a print head according to modification 5 of the embodiment.

[3] Bubble hold areas may be provided only one of two regions sandwiching a flow passage area 20 in the direction of flow of ink I. For example, as in a print head 1D of modification 4 shown in FIG. 15, bubble hold areas 21D covering second individual electrodes 15D may be provided only on a region nearer to the supply opening 13c than the flow passage area 20 covering a first individual electrode 14, i.e., on a right region in FIG. 15. Alternatively, as in a print head 1E of modification 5 shown in FIG. 16, bubble hold areas 21E covering second individual electrodes 15E may be provided only on a region nearer to the discharge opening 13d than the flow passage area 20 covering a first individual electrode 14, i.e., on a left region in FIG. 16.

Figure 17:
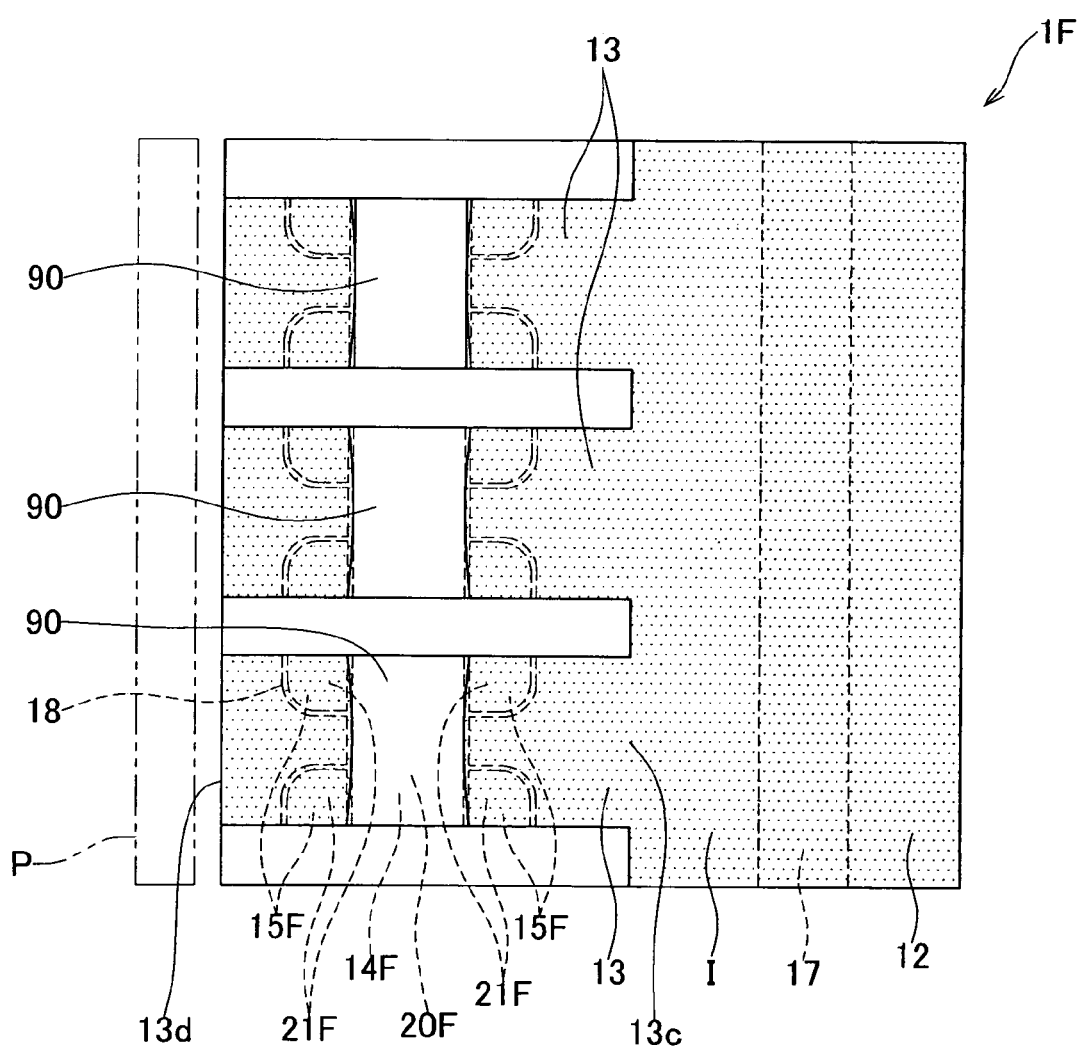
FIG. 17 is a cross sectional view of a print head according to modification 6 of the embodiment, in a state wherein a flow passage is closed.
Figure 18:
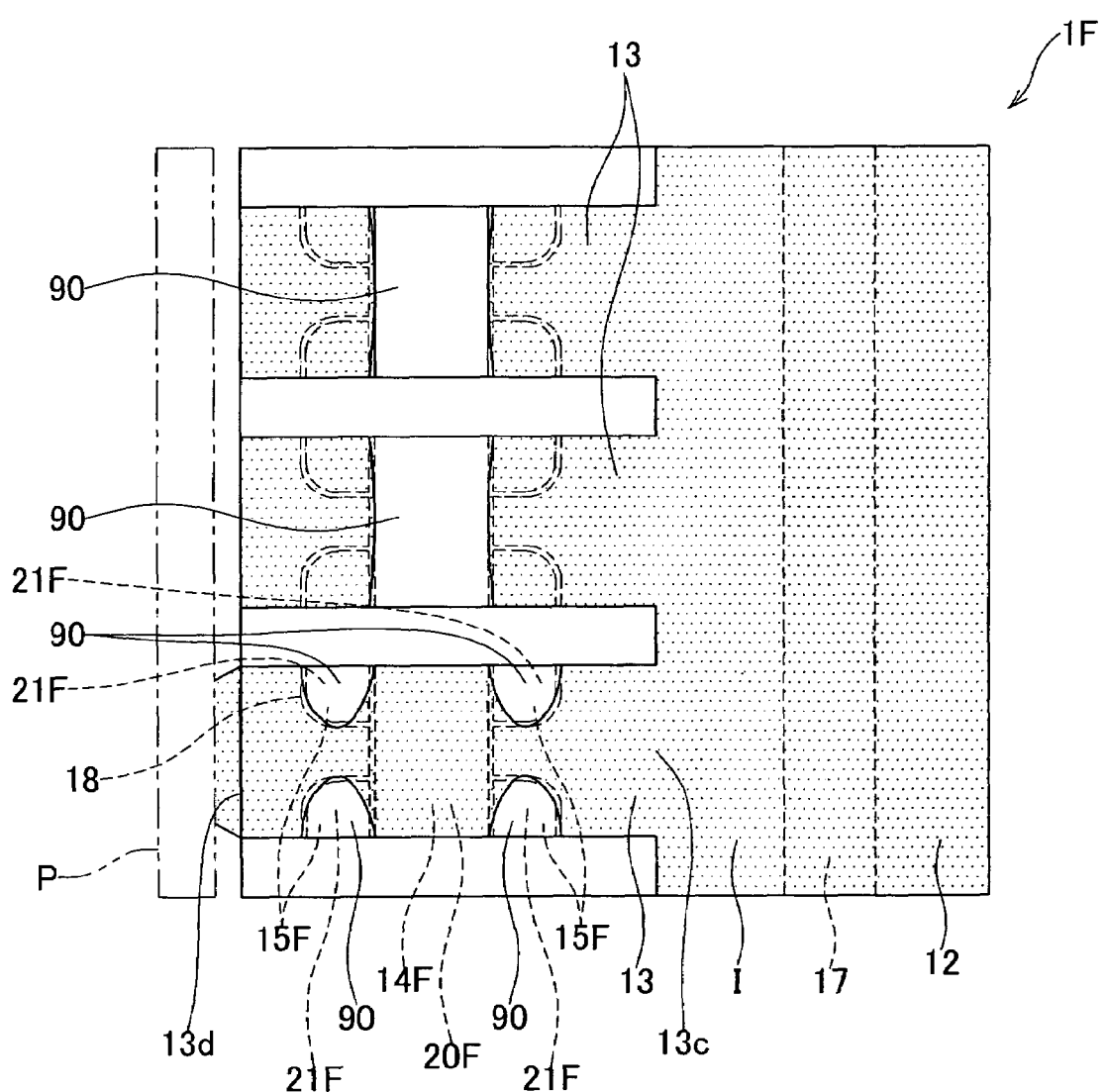
FIG. 18 is a cross sectional view of the print head according to the modification 6, in a state wherein part of the flow passage is opened.

[4] The high liquid-repellent area always high in liquid-repellent may be omitted. For example, as shown in FIGS. 17 and 18, in a print head 1F of modification 6, a flow passage area 20F covering a first individual electrode 14F is provided on the bottom surface 13a of each ink flow passage 13 so as to occupy the whole width of the ink flow passage 13. Further, four bubble hold areas 21F substantially rectangular in plane, covering respective second individual electrodes 15F, are provided on both end portions in a width direction of the ink flow passage 13. The bubble hold areas 21F are provided on both of a region nearer to the supply opening 13c than the flow passage area 20 covering the first individual electrode 14F, and a region nearer to the discharge opening 13d than the flow passage area 20.

When the second individual electrodes 15F are at a positive potential and the first individual electrode 14F is at the ground potential, the liquid-repellent of the bubble hold areas 21F of the insulating film 18 covering the second individual electrodes 15F has been lowered while the liquid-repellent of the flow passage area 20F covering the first individual electrode 14F is high. Therefore, as shown in FIG. 17, a bubble 90 exists on the flow passage area 20F to stop, i.e., close, the ink flow passage 13. In this modification, because the flow passage area 20F occupies the whole width of the ink flow passage 13, the bubble 90 divides ink into two parts, and thereby, the ink flow passage 13 is surely closed.

When the first individual electrode 14F is set at a positive potential and the second individual electrodes 15F are set at the ground potential from the above state, the liquid-repellent of the flow passage area 20F of the insulating film 18 covering the first individual electrode 14F is lowered while the liquid-repellent of the bubble hold areas 21F of the insulating film 18 covering the second individual electrodes 15F become high. Therefore, as shown in FIG. 18, the bubble 90 is divided into four parts, and the divided bubbles 90 move from the flow passage area 20F to the respective bubble hold areas 21F to open the ink flow passage 13. In this modification, because the bubble hold areas 21F are provided only on both end portions in a width direction of the ink flow passage 13, a central portion in the width direction of the ink flow passage 13 is surely opened when the bubbles 90 move to the bubble hold areas 21F.

As shown in FIG. 18, in order that each of the bubbles 90 having moved to the bubble hold areas 21F is deformed into a shape that can hinder, as little as possible, the flow of ink I through the central portion in a width direction of the ink flow passage 13, one of four corners of each bubble hold area 21F, being inside in a width direction of the ink flow passage 13 and far from the flow passage area 20F, is rounded.

Figure 19:
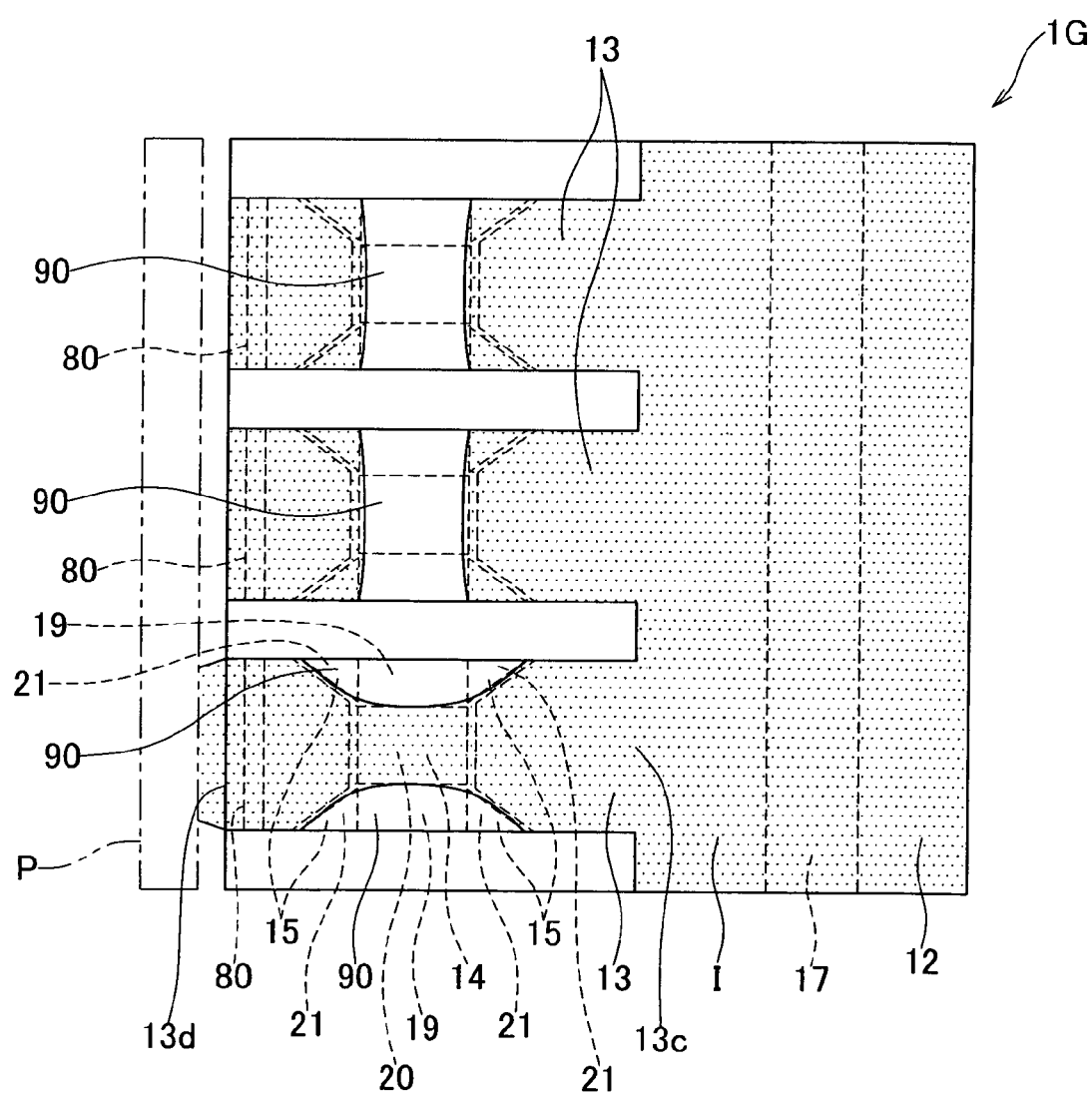
FIG. 19 is a cross sectional view of a print head according to modification 7 of the embodiment.

[5] As in a print head 1G of modification 7 shown in FIG. 19, in addition to the common electrode 17 formed in the manifold flow passage 12, a common electrode 80 as a fifth electrode, being always grounded, may be formed in each ink flow passage 13 in a region nearer to the discharge opening 13d than the region where the insulating film 18 is provided. In this modification, even when a bubble 90 exists on the flow passage area 20 to close the ink flow passage 13, parts of ink I divided by the bubble 90, in a region nearer to the supply opening 13c than the bubble 90 and in a region nearer to the discharge opening 13d than the bubble 90, are in contact with the respective common electrodes 17 and 80 to be kept at the ground potential. Therefore, even when the first individual electrode 14 is set at a positive potential for opening the ink flow passage 13 from a closed state, the difference in potential between the first individual electrode 14 and either of the parts of ink I in the region nearer to the supply opening 13c than the bubble 90 and in the region nearer to the discharge opening 13d than the bubble 90, is wide. Thus, the ink flow passage can be efficiently opened. In addition, the responsibility of the flow passage opening/closing operation is improved.

In another modification, the common electrode 17 may be omitted. In this modification, when one of the first and second individual electrodes 14 and 15 is set at a positive potential, ink I in the ink flow passage 13 is at an intermediate potential between the first and second individual electrodes 14 and 15 because the other of the electrodes is grounded. Therefore, even in the case of omitting the common electrode 17, a certain difference in potential is generated between the electrode set at the positive potential and the ink I, and thereby, the liquid-repellent of the portion of the insulating film 18 covering the electrode set at the positive potential, is lowered. Thus, the ink flow passage 13 can be opened/closed.

Figure 20:
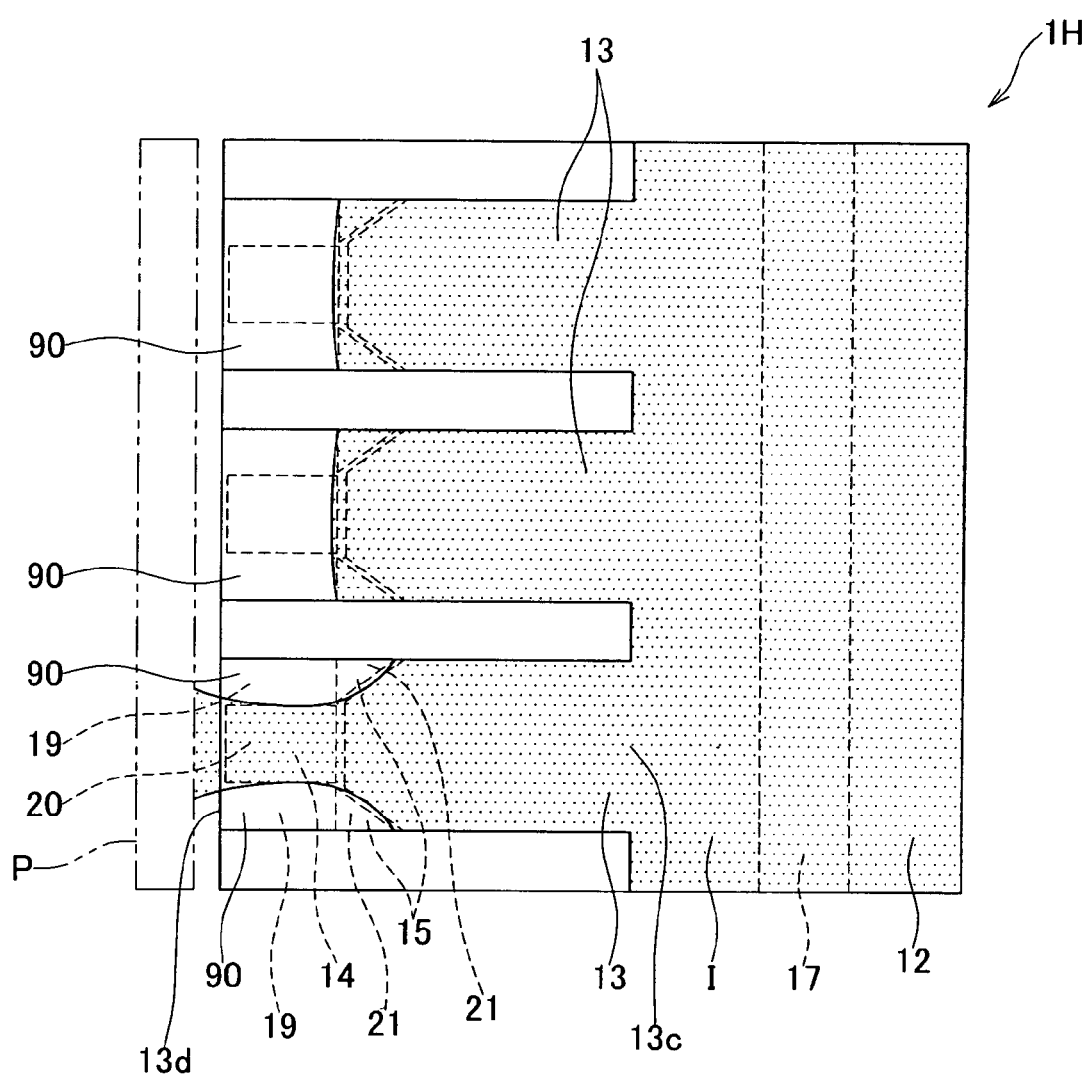
FIG. 20 is a cross sectional view of a print head according to modification 8 of the embodiment.

[6] As in a print head 1H of modification 8 shown in FIG. 20, one end of each ink flow passage 13 may be opened to the outside, and the flow passage area 20 and the bubble hold areas 21 may be formed near the opened end of the ink flow passage 13 so that a bubble 90 may be united to the atmospheric air. In this modification, because the bubble 90 can move between the ink flow passage 13 and the outside, and the bubble 90 can move more rapidly, the responsibility is more improved.

Figure 21:
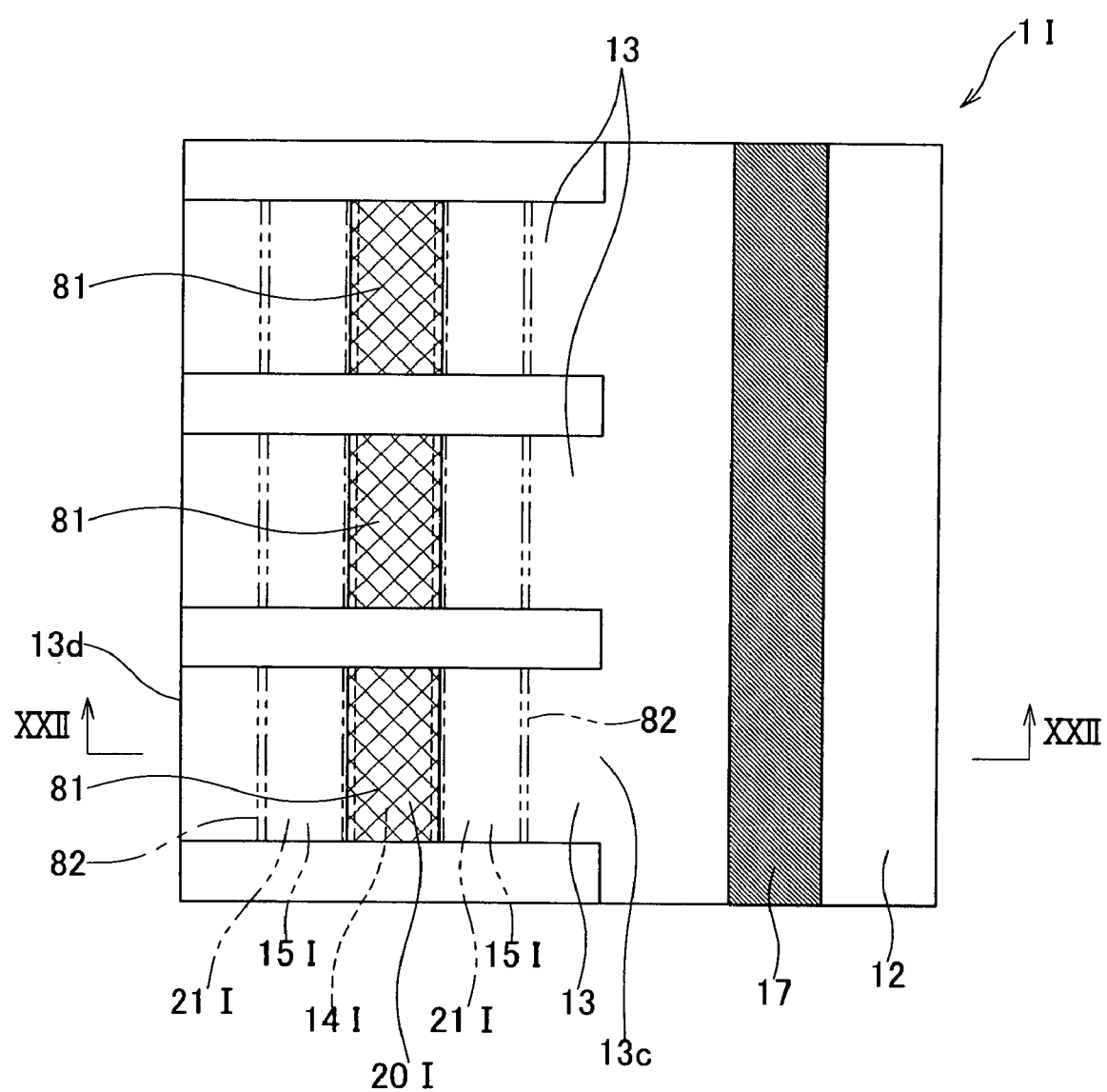
FIG. 21 is a cross sectional view of a print head according to modification 9 of the embodiment.
Figure 22:
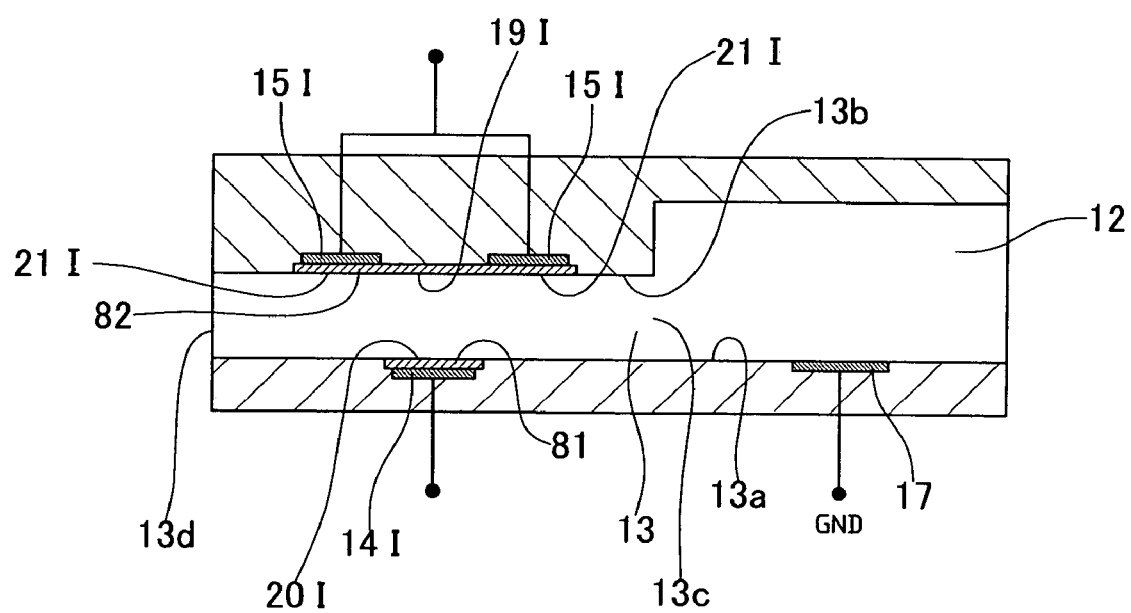
FIG. 22 is a sectional view taken along line XXII-XXII in FIG. 21.

[7] The flow passage area and the bubble hold areas need not always be formed on the same face as in the above-described embodiment. The flow passage area and the bubble hold areas may be formed on opposed two faces, respectively. For example, as shown in FIGS. 21 and 22, in a print head 1I of modification 9, a first insulating film 81 is provided on the bottom face 13a of each ink flow passage 13, and the whole area of the first insulating film 81 serves as a flow passage area 20I covering a first individual electrode 14I. The flow passage area 20I occupies the whole width of the bottom face 13a of the ink flow passage 13 in a substantially central portion in the length of the ink flow passage 13.

A second insulating film 82 is provided on the upper face 13b of the ink flow passage 13. The second insulating film 82 has a high liquid-repellent area 19I always high in liquid-repellent, and two bubble hold areas 21I. The high liquid-repellent area 19I is formed so as to be opposed to the flow passage area 20I. The bubble hold areas 21I are formed in a region nearer to the supply opening 13c than the high liquid-repellent area 19I, and in a region nearer to the discharge opening 13d than the high liquid-repellent area 19I. Either of the bubble hold areas 21I occupies the whole width of the upper face 13b of the ink flow passage 13. The high liquid-repellent area 19I also occupies the whole width of the upper face 13b of the ink flow passage 13.

Figure 23:
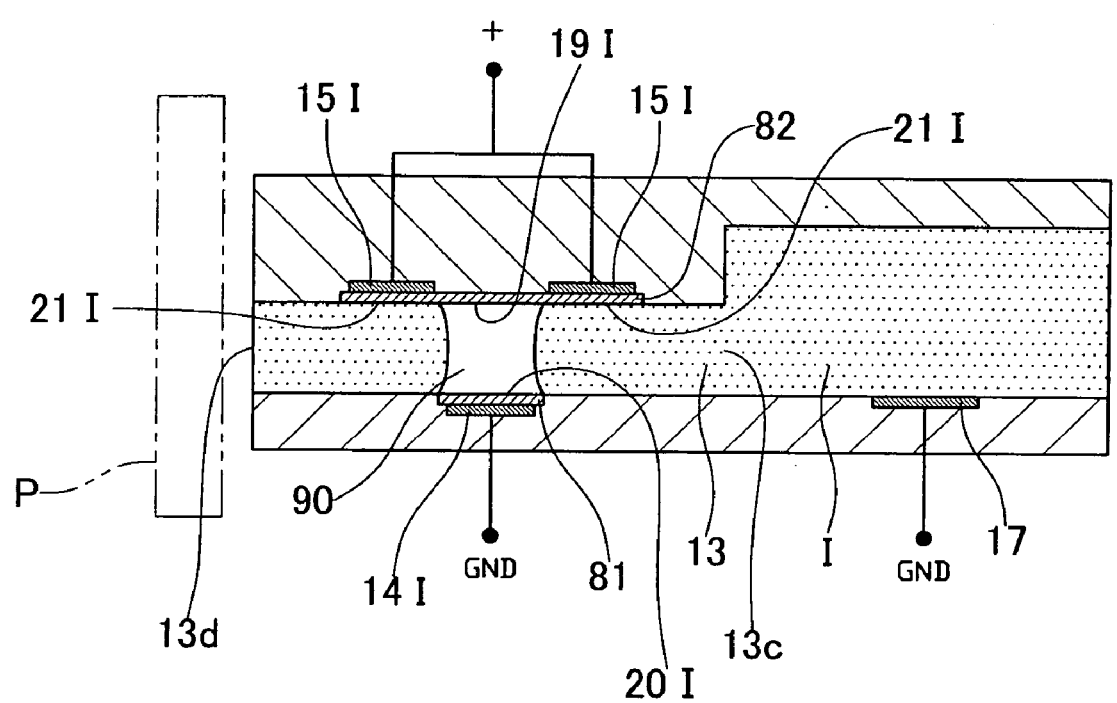
FIG. 23 is a cross sectional view of the print head according to the modification 9, in a state wherein a flow passage is closed.

When the second individual electrodes 15I are at a positive potential and the first individual electrode 14I is at the ground potential, the liquid-repellent of the flow passage area 20I on the bottom face 13a of the ink flow passage 13 is high. Therefore, as shown in FIG. 23, a bubble 90 is held between the flow passage area 20I on the bottom face 13a and the high liquid-repellent area 19I on the upper face 13b opposed to the flow passage area 20I. At this time, because either of the flow passage area 20I and the high liquid-repellent area 19I occupies the width of the ink flow passage 13, the ink flow passage 13 is surely closed by the bubble 90. In addition, because the bubble 90 is surely held by the opposed flow passage area 20I and high liquid-repellent area 19I, the bubble 90 is hard to be displaced by the pressure of ink I. Thus, the ink flow passage 13 can be closed more surely.

Figure 24:
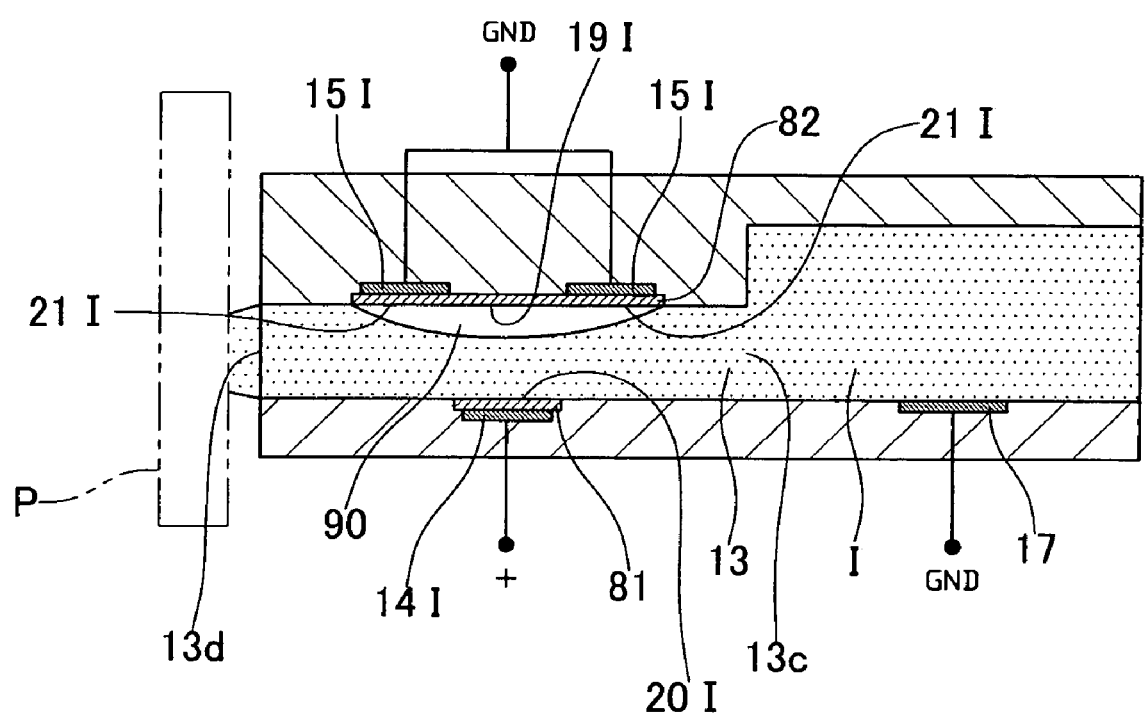
FIG. 24 is a cross sectional view of the print head according to the modification 9, in a state wherein part of the flow passage is opened.

When the first individual electrode 14I is set at a positive potential and the second individual electrodes 15I are set at the ground potential from the above state, the liquid-repellent of the flow passage area 20I on the bottom face 13a of the ink flow passage 13 is lowered while the liquid-repellent of the bubble hold areas 21I on the upper face 13b of the ink flow passage 13 become high. Therefore, as shown in FIG. 24, the bubble 90 adheres to the bubble hold areas 21I and high liquid-repellent area 19I on the upper face 13b of the ink flow passage 13. Thereby, the ink flow passage 13 is opened and ink I can flow downstream.

[8] In the above-described embodiment and modifications, each ink flow passage 13 is rectangular in cross section. However, the present invention is not limited to that. For example, each ink flow passage 13 may have its cross section of an ellipse the long axis of which extends parallel to the width of the flow passage, or each ink flow passage 13 may have its cross section of a circle. In such a case, however, an inner face of the flow passage on which the flow passage area and bubble hold areas are to be formed, that is, a face corresponding to the bottom face 13a in the above-described embodiment, preferably extends from one end to the other end of the width of the flow passage.

[9] In the above-described embodiment and modifications, moreover, the common electrode which is in contact with the ink I is always grounded, and at the same time a potential signal of the ground potential is supplied to any one of the first and second individual electrodes while a potential signal of a positive potential is supplied to the other of the first and second individual electrodes. However, this is not limitative. For example, it is also possible that a potential signal of a positive potential is always supplied to the common electrode which is in contact with the ink I, and at the same time a potential signal of the ground potential is supplied to any one of the first and second individual electrodes while a potential signal of a negative potential is supplied to the other of the first and second individual electrodes.

[10] Hereinbefore described was an embodiment and modifications in which the present invention was applied to a printer for transferring ink. However, the present invention can be applied also to a liquid transfer device for transferring conductive liquid other than ink, for example, a liquid transfer device for transferring liquid, such as chemical liquid or a biochemical solution, in a micro total analysis system (micro TAS); a liquid transfer device for transferring liquid, such as a solvent or a chemical solution, in a micro chemical system; a liquid transfer device for transferring liquid, such as a fuel or water, in a fuel cell; etc.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A liquid transfer device comprising:
a liquid flow passage defined by one or more flow passage defining faces, the liquid flow passage comprising one or more insulating regions and a first neighboring region formed on at least one of the flow passage defining faces, the first neighboring region being lower in liquid-repellent than one or more of the insulating regions and neighboring one or more of the insulating regions in a direction of flow of liquid;
a first electrode covered with a flow passage area provided in at least one of the insulating regions so as to immediately neighbor the first neighboring region, the flow passage area extending over a whole length of at least one of the insulating regions in the direction of flow of liquid;
a second electrode covered with a first bubble hold area provided in at least one of the insulating regions so as to immediately neighbor the first neighboring region; and
an opening/closing controller that controls potentials of the first and second electrodes to change over the liquid flow passage between a first state wherein pressurized liquid is transferred on the flow passage area with the first bubble hold area being controlled so as to be covered with no liquid, and a second state wherein the liquid flow passage is closed by a meniscus formed such that the first bubble hold area is covered with liquid and the flow passage area is covered with no liquid.

2. The liquid transfer device according to claim 1, wherein a length, perpendicular to the direction of flow of liquid, of the first bubble hold area at its one end most distant from the flow passage area in the direction of flow of liquid, is shorter than a length, perpendicular to the direction of flow of liquid, of the first bubble hold area at its other end.

3. The liquid transfer device according to claim 2, wherein the flow passage area and the first bubble hold area do not overlap each other in the direction of flow of liquid.

4. The liquid transfer device according to claim 1, wherein the opening/closing controller controls the first electrode to be at a ground potential in the second state, and the second electrode to be at the ground potential in the first state.

5. The liquid transfer device according to claim 1,
wherein the liquid flow passage comprises the one or more insulating regions, the first neighboring region, and a second neighboring region lower in liquid-repellent than the one or more insulating regions and provided so as to neighbor the one or more insulating regions and cooperate with the first neighboring region to sandwich the one or more insulating regions in the direction of flow of liquid;
the liquid transfer device further comprises a third electrode covered with a second bubble hold area formed in at least one of the insulating regions so as to neighbor the second neighboring region; and
the opening/closing controller controls potentials of the first to third electrodes to change over the liquid flow passage between a first state wherein pressurized liquid is transferred on the flow passage area with the first and second bubble hold areas being controlled so as to be covered with no liquid, and a second state wherein the liquid flow passage is closed by a meniscus formed such that the first and second bubble hold areas are covered with liquid and the flow passage area is covered with no liquid.

6. The liquid transfer device according to claim 5, wherein lengths, perpendicular to the direction of flow of liquid, of the first and second bubble hold areas at their one ends most distant from the flow passage area in the direction of flow of liquid, are shorter than lengths, perpendicular to the direction of flow of liquid, of the first and second bubble hold areas at their other ends.

7. The liquid transfer device according to claim 5, wherein the flow passage area and the first and second bubble hold areas do not overlap each other in the direction of flow of liquid.

8. The liquid transfer device according to claim 5, wherein the opening/closing controller controls the first electrode to be at a ground potential in the second state, and the second and third electrodes to be at the ground potential in the first state.

9. The liquid transfer device according to claim 8, wherein the flow passage area is formed so that gas exists over a whole cross section, perpendicular to the direction of flow of liquid, of the liquid flow passage at a position where the flow passage area is formed, because of liquid-repellent of the flow passage area, when the opening/closing controller sets the liquid flow passage in the second state.

10. The liquid transfer device according to claim 9, wherein gas exists in part of the cross section, perpendicular to the direction of flow of liquid, of the liquid flow passage at a position of the one or more insulating regions other than the flow passage area, when the opening/closing controller sets the liquid flow passage in the first state.

11. The liquid transfer device according to claim 5, wherein the flow passage defining face on which the one or more insulating regions where the flow passage area is formed is provided, and the flow passage defining face on which the one or more insulating regions where the first and second bubble hold areas are formed is provided, are opposed to each other, and a high liquid-repellent area to be always covered with no liquid is formed in the one or more insulating regions where the first and second bubble hold areas are formed, so as to be opposed to the flow passage area and sandwiched by the first and second bubble hold areas.

12. The liquid transfer device according to claim 1, wherein a high liquid-repellent area to be always covered with no liquid is formed in at least one of the insulating regions so as to neighbor either of the flow passage area and an area to be covered with no liquid when the opening/closing controller sets the liquid flow passage in the first state, and to be covered with liquid when the opening/closing controller sets the liquid flow passage in the second state.

13. The liquid transfer device according to claim 12, wherein the high liquid-repellent area is formed so that gas exists over a whole cross section, perpendicular to the direction of flow of liquid, of the liquid flow passage at a position where the flow passage area is formed, because of liquid-repellent of the flow passage area and liquid-repellent of the high liquid-repellent area, when the opening/closing controller sets the liquid flow passage in the second state.

14. The liquid transfer device according to claim 13, wherein the high liquid-repellent area is formed so that gas exists in part of the cross section, perpendicular to the direction of flow of liquid, of the liquid flow passage at a position where the one or more insulating regions are formed, when the opening/closing controller sets the liquid flow passage in the first state.

15. The liquid transfer device according to claim 14, wherein the high liquid-repellent area is formed so that liquid can pass near a central portion of the cross section, perpendicular to the direction of flow of liquid, of the liquid flow passage at the position where the one or more insulating regions are formed, when the opening/closing controller sets the liquid flow passage in the first state.

16. The liquid transfer device according to claim 14, wherein the high liquid-repellent area is formed so that gas exists near a central portion of the cross section, perpendicular to the direction of flow of liquid, of the liquid flow passage at the position where the one or more insulating regions are formed, when the opening/closing controller sets the liquid flow passage in the first state.

17. The liquid transfer device according to claim 14, wherein the high liquid-repellent area is formed so that gas exists at a position near an edge of the cross section, perpendicular to the direction of flow of liquid, of the liquid flow passage at the position where the one or more insulating regions are formed, when the opening/closing controller sets the liquid flow passage in the first state.

18. The liquid transfer device according to claim 1, wherein one end of the liquid flow passage is opened to outside; the one or more insulating regions are formed near the one end of the liquid flow passage; and the gas existing on the one or more insulating regions are connected to atmospheric air.

19. The liquid transfer device according to claim 1, wherein a fourth electrode being always grounded and to be in contact with liquid is formed on an inner surface of a manifold flow passage for supplying liquid into the liquid flow passage.

20. The liquid transfer device according to claim 19, wherein a fifth electrode being always grounded and to be in contact with liquid is formed on at least one of the flow passage defining faces in a region opposite to a region where the fourth electrode is formed, with respect to the one or more insulating regions in the direction of flow of liquid.

21. The liquid transfer device according to claim 1, wherein the opening/closing controller comprises:

a liquid flow amount determining section that determines an amount of liquid to flow in the liquid flow passage; and an open time determining section that determines a time period for opening the liquid flow passage from the first state to the second state of the liquid flow passage.

22. The liquid transfer device according to claim 1, wherein the flow passage area occupies a whole width of the liquid flow passage.

23. The liquid transfer device according to claim 22, wherein the first bubble hold area occupies part of the width of the liquid flow passage.

24. The liquid transfer device according to claim 1, wherein a high liquid-repellent area to be always covered with no liquid is formed in the one or more insulating regions so as to neighbor the flow passage area in the direction of flow of liquid, and the flow passage area and the high liquid-repellent area occupy a whole width of the liquid flow passage.

25. The liquid transfer device according to claim 24, wherein the high liquid-repellent area neighbors the first bubble hold area in the direction of flow of liquid, and the first bubble hold area and the high liquid-repellent area occupy part of the width of the liquid flow passage.

26. The liquid transfer device according to claim 25, wherein the flow passage area is formed on the flow passage defining face in a central portion of the width of the liquid flow passage, and the first bubble hold area and the high liquid-repellent area are formed in each end portion of the width of the liquid flow passage.

27. The liquid transfer device according to claim 25, wherein the flow passage area is formed on the flow passage defining face in each end portion of the width of the liquid flow passage, and the first bubble hold area and the high liquid-repellent area are formed in a central portion of the width of the liquid flow passage.

28. The liquid transfer device according to claim 25, wherein the flow passage area is formed on the flow passage defining face in one end portion of the width of the liquid flow passage, and the first bubble hold area and the high liquid-repellent area are formed in the other end portion of the width of the liquid flow passage.

29. The liquid transfer device according to claim 1, wherein the flow passage defining face on which the insulating region where the flow passage area is formed is provided, and the flow passage defining face on which the one or more insulating regions where the first bubble hold area is formed is provided, are opposed to each other, and a high liquid-repellent area to be always covered with no liquid is formed in the one or more insulating regions where the first bubble hold area is formed, so as to be opposed to the flow passage area and neighbor the first bubble hold area.

30. The liquid transfer device according to claim 29, wherein either of the flow passage area and the high liquid-repellent area occupies a whole width of the liquid flow passage.

31. The liquid transfer device according to claim 1, wherein the liquid flow passage comprises only one insulating region.

32. A liquid transfer device comprising:
a liquid flow passage substantially rectangular in cross section, comprising an insulating region and a first and a second neighboring regions formed on one flow passage defining face, the first and second neighboring regions being lower in liquid-repellent than the insulating region and neighboring the insulating region so as to sandwich the insulating region in a direction of flow of liquid;

a first electrode covered with a flow passage area provided in the insulating region in a central portion of a width of the flow passage defining face so as to neighbor the first and second neighboring regions and extend over a whole length of the insulating region in the direction of flow of liquid;

two second electrodes each covered with a first bubble hold area formed in the insulating region at each end of the width of the flow passage defining face so as to neighbor the first neighboring region and not to overlap the flow passage area in the direction of flow of liquid;

two third electrodes each covered with a second bubble hold area formed in the insulating region at each end of the width of the flow passage defining face so as to neighbor the second neighboring region and not to overlap the flow passage area in the direction of flow of liquid; and an opening/closing controller that controls potentials of the first to third electrodes to change over the liquid flow passage between a first state wherein pressurized liquid is transferred on the flow passage area with the first and second bubble hold areas being controlled so as to be covered with no liquid, and a second state wherein the liquid flow passage is closed by a meniscus formed such that the first and second bubble hold areas are covered with liquid and the flow passage area is covered with no liquid.

33. A liquid transfer device comprising:

a liquid flow passage that can allow pressurized liquid to flow therethrough;

a first electrode;

a second electrode;

a potential signal supply unit that supplies potential signals to the respective first and second electrodes;

an insulating region comprising a flow passage area covering the first electrode on an inner surface of the liquid flow passage, and a bubble hold area covering the second electrode on an inner surface of the liquid flow passage;

a neighboring region formed on an inner surface of the liquid flow passage, the neighboring region being lower in liquid-repellent than the flow passage area when there is no difference in potential between the liquid and the first electrode, and than the bubble hold area when there is no difference in potential between the liquid and the second electrode; and a potential change instruction unit that instructs the potential signal supply unit to supply a potential signal to the second electrode so as to generate a difference in potential between the liquid and the second electrode so that gas exists on a surface of the flow passage area to close the liquid flow passage, and that instructs the potential signal supply unit to supply a potential signal to the first electrode so as to generate a difference in potential between the liquid and the first electrode so that gas exists on a surface of the bubble hold area to open the liquid flow passage to the flow of the pressurized liquid therethrough.

34. A liquid transfer head comprising:

a liquid flow passage defined by one or more flow passage defining faces, the liquid flow passage comprising insulating regions and a first neighboring region formed on at least one of the flow passage defining faces, the first neighboring region being lower in liquid-repellent than the insulating regions and neighboring the insulating regions in a direction of flow of liquid;

a first electrode covered with a flow passage area provided in at least one of the insulating regions so as to immediately neighbor the first neighboring region, the flow passage area extending over a whole length of the at least one insulating region in the direction of flow of liquid; and a second electrode covered with a first bubble hold area provided in at least one of the insulating regions so as to immediately neighbor the first neighboring region.

35. A liquid transfer head comprising:

a liquid flow passage substantially rectangular in cross section, comprising an insulating region and a first and a second neighboring regions formed on one flow passage defining face, the first and second neighboring regions being lower in liquid-repellent than the insulating region and neighboring the insulating region so as to sandwich the insulating region in a direction of flow of liquid;

a first electrode covered with a flow passage area provided in the insulating region in a central portion of a width of the flow passage defining face so as to neighbor the first and second neighboring regions and extend over a whole length of the insulating region in the direction of flow of liquid;

two second electrodes each covered with a first bubble hold area formed in the insulating region at each end of the width of the flow passage defining face so as to neighbor the first neighboring region and not to overlap the flow passage area in the direction of flow of liquid; and two third electrodes each covered with a second bubble hold area formed in the insulating region at each end of the width of the flow passage defining face so as to neighbor the second neighboring region and not to overlap the flow passage area in the direction of flow of liquid.

* * * * *